(12) United States Patent
Yamaguchi

(10) Patent No.: US 7,805,530 B2
(45) Date of Patent: Sep. 28, 2010

(54) INTERACTIVE CONTENT DELIVERY SERVER, A METHOD AND A COMPUTER PROGRAM PRODUCT FOR INTERACTIVELY DELIVERING CONTENT

(75) Inventor: Kazuhiko Yamaguchi, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1064 days.

(21) Appl. No.: 11/468,075

(22) Filed: Aug. 29, 2006

(65) Prior Publication Data
US 2007/0067420 A1    Mar. 22, 2007

(30) Foreign Application Priority Data
Aug. 31, 2005    (JP)    ............... 2005-252854

(51) Int. Cl.
*G06F 15/16*    (2006.01)
(52) U.S. Cl. ........................ 709/229; 709/219
(58) Field of Classification Search .................. 709/229
See application file for complete search history.

(56) References Cited

U.S. PATENT DOCUMENTS

| | | | |
|---|---|---|---|
| 6,515,621 B2 | 2/2003 | Aoyama | |
| 6,554,707 B1 | 4/2003 | Sinclair et al. | |
| 6,733,392 B2 | 5/2004 | Narita | |
| 6,761,638 B1 | 7/2004 | Narita | |
| 6,793,580 B2 | 9/2004 | Sinclair et al. | |
| 2002/0023010 A1* | 2/2002 | Rittmaster et al. | 705/26 |
| 2002/0045484 A1* | 4/2002 | Eck et al. | 463/42 |
| 2002/0063654 A1 | 5/2002 | Aoyama | |

(Continued)

FOREIGN PATENT DOCUMENTS
EP    1437876    7/2004

(Continued)

OTHER PUBLICATIONS

Benford, The Error of Our Ways—The Experience of Self-Reported Position in a Location-Based Game, 2004, Springer Berlin / Heidelberg, Vo. 3205/2004, p. 70-87.*

(Continued)

*Primary Examiner*—Hassan Phillips
*Assistant Examiner*—Arvin Eskandarnia
(74) *Attorney, Agent, or Firm*—Greenblum & Bernstein, P.L.C.

(57) ABSTRACT

A user participation type game is provided that keeps a user interested in the game, or provides the user with an adequate sense of enjoyment while playing the game by changing content to be delivered on a game in which a scene is shifted in accordance with a predetermined scenario, and increasing variation of a story on the game. Multiple kinds of access related information relating to access by a user terminal (for example, positional information of the user terminal, a number of accesses by the user terminal, an access frequency, and an access time) are specified when the interactive content delivery server is accessed from the user terminal. Content corresponding to the multiple kinds of access related information thus specified is selected on the basis of scenario definition information in which the multiple kinds of access related information respectively correspond to multiple contents that can be delivered on the game so that content to be delivered is selected in accordance with the scenario. The content thus selected is delivered to the user terminal.

16 Claims, 13 Drawing Sheets

U.S. PATENT DOCUMENTS

2004/0152518 A1    8/2004  Kogo
2004/0255123 A1*  12/2004  Noyama et al. ............. 713/176
2005/0130744 A1*   6/2005  Eck et al. ..................... 463/43
2005/0153760 A1*   7/2005  Varley .......................... 463/1

FOREIGN PATENT DOCUMENTS

| GB | 2355627 | 4/2001 |
| JP | 2000-237458 | 9/2000 |
| JP | 2001-096069 | 4/2001 |
| JP | 2001-187271 | 7/2001 |
| JP | 2001-340642 | 12/2001 |
| JP | 2002-49681 | 2/2002 |
| JP | 2002049681 A * | 2/2002 |
| JP | 2002-159742 | 6/2002 |
| JP | 2004-254206 | 9/2004 |

OTHER PUBLICATIONS

Wiegmans, Location Based Gaming, 2005, University of Twente—The Netherlands, p. 1-69.*
Young, An architecture for integrating plan-based behavior generation with interactive game environments, 2003, North Carolina State University, p. 1-29.*
English language Abstract of JP 2002-49681, Feb. 15, 2002.
English language Abstract of JP 2002-159742. Jun. 4, 2002.
English language Abstract of JP 2000-237458, Sep. 5, 2000.
English language Abstract of JP 2001-340642, Dec. 11, 2001.
English Language Abstract of JP 2001-187271.
English Language Abstract of JP 2001-096069.
English Language Abstract of JP 2004-254206.

* cited by examiner

100: CONTENT INTERACTIVELY DELIVERING SYSTEM

FIG. 3

PROJECT MASTER

| PROJECT CODE | PROJECT NAME |
|---|---|
| 01 | SHINSENGUMI TOUR 2005 |
| 02 | SHINJUKU EATING OUT CAMPAIGN |
| 03 | KOBE PORT SERIAL MURDER CASE |

FIG. 4

PLACE MASTER

| PROJECT CODE | PLACE CODE | AREA INFORMATION | PLACE NAME |
|---|---|---|---|
| 01 | PL01 | (‥,‥)(‥,‥)(‥,‥)(‥,‥) | TAKAHATAFUDOU STATION |
|  | PL02 | (‥,‥)(‥,‥)(‥,‥)(‥,‥) | TAKAHATAFUDOUSON |
|  | PL03 | (‥,‥)(‥,‥)(‥,‥)(‥,‥) | TOSHIZO HIJIKATA MUSEUM |
|  | PL04 | (‥,‥)(‥,‥)(‥,‥)(‥,‥) | YASAKA SHINTO SHRINE |
| 02 | PL01 | (‥,‥)(‥,‥)(‥,‥)(‥,‥) | SUSHI AA |
|  | PL02 | (‥,‥)(‥,‥)(‥,‥)(‥,‥) | JAPANESE FOOD BB |
|  | PL03 | (‥,‥)(‥,‥)(‥,‥)(‥,‥) | ITALIAN CUISINE CC |
|  | PL04 | (‥,‥)(‥,‥)(‥,‥)(‥,‥) | BAR DD |
|  | PL05 | (‥,‥)(‥,‥)(‥,‥)(‥,‥) | DESSERT EE |
| 03 | PL01 | (‥,‥)(‥,‥)(‥,‥)(‥,‥) | KOBE STATION |
|  | . | . | . |

FIG. 5

USER HISTORY FILE ↓ NUMBER OF ACCESS

| USER CODE | PROJECT CODE | PL01 | PL02 | PL03 | PL04 | PL05 | ... |
|---|---|---|---|---|---|---|---|
| ASDFGHJK1456 | 01 | 1 | 3 | 1 | 1 | – | – |
|  | 02 | 1 | 0 | 1 | 0 | 1 | – |
| QWERTYUI9876 | 01 | 1 | 1 | 1 | 0 | – | – |
|  | 03 | 1 | 0 | 0 | 0 | 0 | 0 |
| ZXCVBNM32567 | 01 | 1 | 0 | 0 | 0 | – | – |
|  | 02 | 1 | 1 | 1 | 1 | 1 | – |

FIG. 6

SCENARIO DEFINITION FILE

| PROJECT CODE | PLACE CODE | GAME CONTINUABLE PERIOD OF TIME | TIME ZONE | NUMBER OF ACCESS | CONTENT SITE NAME | ELEMENT a | ELEMENT b | ELEMENT c | ELEMENT d | ELEMENT e |
|---|---|---|---|---|---|---|---|---|---|---|
| 01 | PL01 | — | 6:00~15:00 | 1~9999 | fudouekishuhen.html | | | | | |
| 01 | PL02 | — | 6:00~17:00 | 1 | fudouson1hiru.html | | | | | |
| | | | | 2~9999 | fudouson2hiru.html | | | | | |
| | | | 17:00~24:00 | 1 | fudouson1yoru.html | | | | | |
| | | | | 2~9999 | fudouson2yoru.html | | | | | |
| 01 | PL03 | — | 10:00~18:00 | 1~9999 | hijikata.html | | | | | |
| 01 | PL04 | — | 10:00~18:00 | 1~9999 | yasakahiru.html | | | | | |
| | | | 18:00~24:00 | 1~9999 | yasakayoru.html | | | | | |
| 01 | OTHER THAN THOSE ABOVE | — | — | 1~9999 | index.html | | | | | |
| 02 | PL01 | FOR ONE MONTH | — | 1~9999 | sushi.html | | | | | |
| 02 | PL02 | FOR ONE MONTH | — | 1~9999 | washoku.html | | | | | |
| 02 | PL03 | FOR ONE MONTH | — | 1~9999 | italian.html | | | | | |
| 02 | PL04 | FOR ONE MONTH | — | 1~9999 | bar.html | | | | | |
| 02 | PL05 | FOR ONE MONTH | — | 1~9999 | desert.html | | | | | |
| 02 | OTHER THAN THOSE ABOVE | FOR ONE MONTH | 5:00~18:00 | 1~9999 | shinjuku-tabe-hiru.html | | | | | |
| 02 | OTHER THAN THOSE ABOVE | FOR ONE MONTH | 18:00~29:00 | 1~9999 | shinjuku-tabe-yoru.html | | | | | |
| 03 | PL01 | — | 5:00~18:00 | 1~2 | — | 1 | 1 | 1 | 1 | 1 |
| | | | | 3~9999 | | 1 | 1 | 3 | 3 | 1 |
| | | | 18:00~29:00 | 1~2 | | 2 | 2 | 1 | 1 | 1 |
| | | | | 3~9999 | | 2 | 2 | 3 | 3 | 1 |
| 03 | PL02 | — | ... | ... | | . | . | . | . | . |
| ... | ... | | | | | . | . | . | . | . |

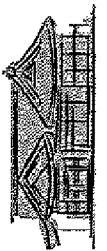

FIG. 8D fudouson2hiru.html

TAKAHATA-
FUDOUSON

Description: Takahatafudouson is ⋯

Tour course
Takahatafudou Station →
Takahatafudouson →
Toshizo Hijikata Museum →
Yasaka Shinto Shrine
Remaining Time required:
About 2 Hours Nearest Shops

■ ■

Move to Toshizo Hijikata Museum.

FIG. 8E fudouson1yoru.html

TAKAHATA-
FUDOUSON

Description: Takahatafudouson is ⋯

Tour course
Takahatafudou Station →
Takahatafudouson →
Toshizo Hijikata Museum →
Yasaka Shinto Shrine
Remaining Time required:
About 2 Hours Nearest Shops

■ ■

Only initial access user can
get beneficial information!

Move to Toshizo Hijikata Museum.

FIG. 8F fudouson2yoru.html

TAKAHATA-
FUDOUSON

Description: Takahatafudouson is ⋯

Tour course
Takahatafudou Station →
Takahatafudouson →
Toshizo Hijikata Museum →
Yasaka Shinto Shrine
Remaining Time required:
About 2 Hours Nearest Shops

■ ■

Move to Toshizo Hijikata Museum.

FIG. 9A hijikata.html

TOSHIZO HIJIKATA
MUSEUM

Description: _____

Tour course
Takahatafudou Station →
Takahatafudouson →
Toshizo Hijikata Museum →
Yasaka Shinto Shrine
Remaining Time required:
About 1.5 Hours Nearest Shops
_____
■  ■

Move to Yasaka Shinto Shrine.

FIG. 9B yasakahiru.html

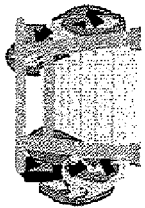

YASAKA
SHINTO SHRINE

Description: _____

Tour course
Takahatafudou Station →
Takahatafudouson →
Toshizo Hijikata Museum →
Yasaka Shinto Shrine
Remaining Time required:
About 1.5 Hours Nearest Shops
_____
■  ■

Access this if you go around all
historical sites and museums!

Move to Nearest Station.

FIG. 9C yasakayoru.html

YASAKA
SHINTO SHRINE

Description: _____

Tour course
Takahatafudou Station →
Takahatafudouson →
Toshizo Hijikata Museum →
Yasaka Shinto Shrine
Remaining Time required:
About 1.5 Hours Nearest Shops
_____
■  ■

Access this if you go around all
historical sites and museums!

Move to Nearest Station.

FIG. 10A
FIG. 10B
shinjuku-tabe-hiru.html (A)
shinjuku-tabe-yoru.html (B)
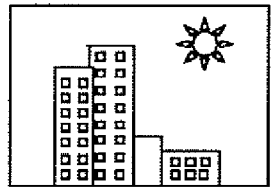

FIG. 10C sushi.html

Sushi AA

Thank you very much for coming in our restaurant today.

Cooking ingredients of our restaurant are ···

Discount ¥5,000 at final restaurant if you eat out at X more restaurants!!

- Our business hours are from 11 a.m. to 10 p.m. on Monday to Saturday.
- Telephone number: 03-XXXX-XXXX Register it in your telephone directory.
- You can evaluate this restaurant.
- Move to next restaurant

FIG. 10D washoku.html

Japanese food BB

Thank you very much for coming in our restaurant today.

Discount ¥5,000 at final restaurant if you eat out at X more restaurants!!

- Our business hours are from 11 a.m. to 10 p.m. on Monday to Saturday.
- Telephone number: 03-XXXX-XXXX Register it in your telephone directory.
- You can evaluate this restaurant.
- Move to next restaurant.

FIG. 10E italian.html

Italian cuisine CC

Thank you very much for coming in our restaurant today.

Cooking ingredients of our restaurant are ···

Discount ¥5,000 at final restaurant if you eat out at X more restaurants!!

- Our business hours are from 11 a.m. to 10 p.m. on Monday to Saturday.
- Telephone number: 03-XXXX-XXXX Register it in your telephone directory.
- You can evaluate this restaurant.
- Move to next restaurant.

FIG. 11A bar.html

Bar DD

Thank you very much for coming in our restaurant today.

Cooking ingredients of our restaurant are ···

Discount ¥5,000 at final restaurant if you eat out at X more restaurants!!

- Our business hours are from 11 a.m. to 10 p.m. on Monday to Saturday.
- Telephone number: 03-XXXX-XXXX Register it in your telephone directory.
- You can evaluate this restaurant.
- Move to next restaurant.

FIG. 11B desert.html

Dessert EE

Thank you very much for coming in our restaurant today.

Cooking ingredients of our restaurant are ···

You can reduce ¥5,000 at this restaurant if you show this screen to waiter!!

- Our business hours are from 11 a.m. to 10 p.m. on Monday to Saturday.
- Telephone number: 03-XXXX-XXXX Register it in your telephone directory.
- You can evaluate this restaurant.
- Move to next restaurant.

FIG. 13
Element a (Character)
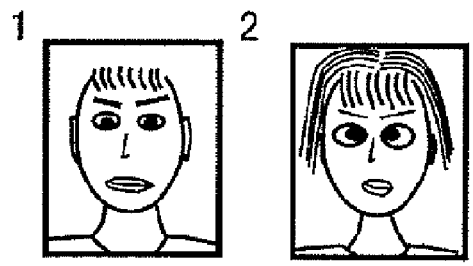
Element b (Background)
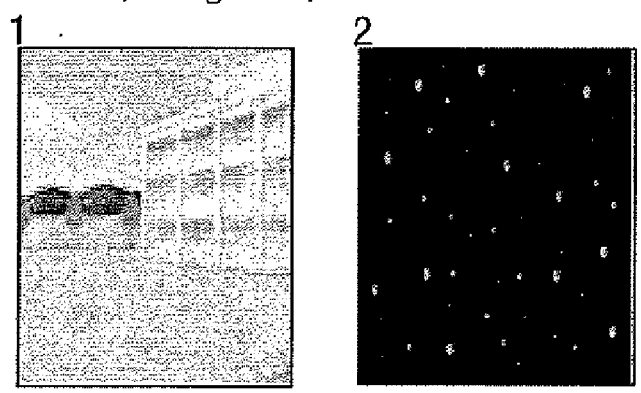
Element c (Lines)
1. "Good afternoon."    2. "Good evening."    3. "By the way ···"
Element d (BGM)
1. "XXXX"    2. "YYYY"    3. "ZZZZ"
Element e (Advertisement)
1. SQUARE ENIX

INTERACTIVE CONTENT DELIVERY SERVER, A METHOD AND A COMPUTER PROGRAM PRODUCT FOR INTERACTIVELY DELIVERING CONTENT

CROSS-REFERENCE TO RELATED APPLICATION

The present disclosure relates to subject matter contained in Japanese Patent Application No. 2005-252854, filed on Aug. 31, 2005, the disclosure of which is expressly incorporated herein by reference in its entirety.

BACKGROUND OF THE INVENTION

1. Field of the Invention

The present invention relates to a technique for selecting content to develop a story in accordance with a predetermined scenario, which is defined in advance in accordance with access related information relating to access by a user terminal (for example, a current position of the user terminal and a number of times the user terminal accesses the content delivery server) that is to be delivered to a user terminal such as a cellular phone terminal. The content is delivered to the user terminal when the user terminal accesses an interactive content delivery server via, for example, a communication network, and delivers the selected content to the user terminal via the communication network.

2. Description of the Related Art

Heretofore, a content delivery system for delivering various types of content such as images, text and sound (voice) to a user terminal such as a personal computer, or a portable communication terminal, via a communication network such as the Internet, has been proposed.

A content delivery system is known, for example, which acquires current positional information from a movable user terminal such as a portable communication terminal, and changes the contents to be delivered to the user terminal in accordance with a current position of the user terminal (for example, see Japanese Patent Application Publications No. 2001-187271, No. 2001-96069, and No. 2004-254206).

Japanese Patent Application Publications No. 2001-187271 and No. 2001-96069 describe that information indicating a current position of a user terminal (for example, identification information transmitted from a base station) is acquired and contents of a game are changed depending on a region where a user carries out the game with the user terminal.

Japanese Patent Application Publication No. 2004-254206 discloses that current positional information is acquired from each of a plurality of user terminals and a lottery is carried out with respect to user terminals that are positioned within a predetermined area on the basis of a current position of each user terminal, which is indicated by the current positional information.

In the publications described above, although content to be delivered to a user terminal may be changed depending upon a current position of a user terminal, the delivered content cannot be changed by adding additional access related information, for example, relating to access by the user terminal other than a current position of the user terminal. Therefore, there is a problem that it is difficult to provide a user participation type game that keeps a user interested, or provides the user with an adequate sense of enjoyment.

Further, there is a problem that such conventional techniques, which just change contents to be delivered to a user terminal depending upon a current position of the user terminal, fail to motivate a user to continue a game that proceeds by receiving such content changes.

In this case, although a user access time and a number of times a user accesses a server apparatus that delivers the content is thought of as the access related information relating to access by the user terminal in addition to the current position of the user terminal, it is difficult to provide a user participation type game that keeps a user interested in the game, or provides the user with an adequate sense of enjoyment while playing the game just by changing contents delivered to the user terminal in accordance with only specific situations. Thus, this type of system fails to motivate a user to continue a game.

Namely, just adding a current position of a user terminal or a user access time independently among access related information relating to access by the user terminal on a game cannot cause adequate variation of content to be delivered, and therefore, it is impossible to increase variation of a story on the game. For this reason, there is a fear that such a game may become just a local event using each of delivered contents, and will fail to motivate a user to continue the game, resulting in the user getting bored with the game.

SUMMARY OF THE INVENTION

It is an object of the present invention to solve the problems described above and to provide an interactive content delivery server, a method and a computer program product for interactively delivering content by which it is possible to increase variation of a story on a game by changing content to be delivered to the user terminal in accordance with multiple kinds of access related information relating to access by a user terminal on the game. In the game, a scene is shifted in accordance with a predetermined scenario, and it is possible to maintain and improve a user's motivation and desire to continue playing the game. This makes it possible to provide a user participation type game that keeps a user interested in the game, or provides the user with an adequate sense of enjoyment while playing the game.

In order to achieve the above object, one aspect of the present invention is directed to an interactive content delivery server that selects content to be delivered for supplying a game in which a scene is shifted in accordance with a predetermined scenario to a user terminal (for example, user terminals 20 to 2*n*) every time the user terminal accesses the interactive content delivery server. The interactive content delivery server delivers the selected content to the user terminal via a communication network (for example, a communication network 30). The interactive content delivery server (for example, a content delivery server 10) of the present invention includes an access related information specifier (for example, an access related information specifier 14, a portion executing a process at Steps S113 and S114 in the content delivery server 10) that specifies multiple kinds of access related information relating to access by the user terminal (for example, positional information of a user terminal, a number of times a user terminal accesses the server, a frequency of access of the server by the user terminal, and an access time by the user terminal) when the interactive content delivery server is accessed from the user terminal.

The interactive content delivery server also includes a content selector (for example, a content selecting processor 15, a portion executing a process at Step S121 in the content delivery server 10) that selects content corresponding to the multiple kinds of access related information specified by the access related information specifier on the basis of scenario definition information (for example, a scenario definition file shown in FIG. 6). The multiple kinds of access related information correspond to multiple contents that can be delivered on the game so that a content to be delivered is selected in accordance with the scenario.

The interactive content delivery server also includes a content deliverer (for example, a content delivering processor 16, a portion executing a process at Step S122 in the content delivery server 10) that delivers the content selected by the content selector to the user terminal.

Since the interactive content delivery server has the configuration described above, it is possible to increase variation of a story on the game by changing a content to be delivered to a user terminal in accordance with multiple kinds of access related information relating to access by a user terminal on the game in which a scene is shifted in accordance with a predetermined scenario. It also becomes possible to maintain and improve a user's motivation and desire to continue playing the game. This makes it possible to provide a user participation type game that keeps a user interested in the game, or provides the user with an adequate sense of enjoyment while playing the game.

It is preferable that the multiple kinds of access related information include positional information indicating a position of the user terminal that accesses the interactive content delivery server. By constructing the interactive content delivery server in this manner, it is possible to change content to be delivered in accordance with the multiple kinds of access related information including the positional information. This makes it possible to increase variation of a story on the game.

It is preferable that the multiple kinds of access related information further include at least one of a number of accesses indicating a number of times a user terminal accesses the interactive content delivery server on the game, an access time indicating a time when the user terminal accesses the interactive content delivery server, an access season indicating a season in which the user terminal accesses the interactive content delivery server, and an access frequency indicating a frequency of access of the game by the user terminal. By constructing the interactive content delivery server in this manner, it is possible to change the content that is delivered to the user terminal in accordance with the multiple kinds of access related information including at least one of the number of accesses, the access time, the access season and the access frequency, and this makes it possible to increase variation of a story on the game.

It is preferable that the interactive content delivery server further includes a positional information acquirer (for example, a portion executing a process at Step S113 in the content delivery server 10) that acquires positional information from the user terminal via the communication network, wherein the access related information specifier specifies the multiple kinds of access related information including the positional information acquired by the positional information acquirer (for example, Step S113). The content selector selects the content that corresponds to the multiple kinds of access related information including the positional information (for example, Step S121). By constructing the interactive content delivery server in this manner, it is also possible to include the positional information of the user terminal acquired from the user terminal in the multiple kinds of access related information.

It is preferable that the multiple contents, to which the multiple kinds of access related information correspond, include content having guide information for guiding a user who uses the user terminal to multiple predetermined places (for example, contents shown in FIGS. 10A and 10B), and that the content deliverer delivers content including a predetermined privilege (for example, a discount ticket) to the user terminal in the case where the positional information acquirer acquires all kinds of positional information indicating all of the multiple predetermined places. By constructing the interactive content delivery server in this manner, it is possible to maintain and improve a user's motivation and desire to continue playing the game, and this makes it possible to provide a user participation type game that keeps a user interested in the game, or provides the user with an adequate sense of enjoyment while playing the game.

It is preferable that the multiple contents, which correspond to the multiple kinds of access related information including the positional information, include multiple contents (for example, contents shown in FIGS. 8A to 8F, and 9A) each of which has movement information for causing a user, who uses the user terminal, to be moved to a predetermined place different from the position that the positional information indicates. By constructing the interactive content delivery server in this manner, it is possible to maintain and improve a user's motivation and desire to continue playing the game, and this makes it possible to provide a user participation type game that keeps a user interested in the game, or provides the user with an adequate sense of enjoyment while playing the game.

It is preferable that the interactive content delivery server further includes a progress information specifier that specifies progress information indicating progress of the game supplied to the user terminal, wherein the multiple contents set in the scenario definition information include multiple contents, each of which corresponds to the progress information, and the multiple kinds of access related information. The content selector selects content that corresponds to the multiple kinds of access related information specified by the access related information specifier and the progress information specified by the progress information specifier (for example, see a third example). By constructing the interactive content delivery server in this manner, it is possible to further increase variation of a story on the game by changing the content that is to be delivered in accordance with the multiple kinds of access related information relating to access by a user terminal and the progress information indicating progress of the game. Thus, it is possible to maintain and improve a user's motivation and desire to continue playing the game. This makes it possible to provide a user participation type game that keeps a user interested in the game, and also provides the user with a sense of enjoyment while playing the game.

It is preferable that the interactive content delivery server further includes a scenario definition information memory that stores the scenario definition information. This makes it possible to rapidly refer to the scenario definition information.

Further, in another aspect of the present invention, the present invention is directed to a method of interactively delivering content to a user terminal by selecting content to be delivered for supplying a game in which a scene is shifted in accordance with a predetermined scenario every time the user terminal accesses an interactive content delivery server, and delivering the selected content to the user terminal via a communication network. The method of the present invention includes specifying multiple kinds of access related information relating to access by the user terminal when the interactive content delivery server is accessed from the user terminal.

The method also includes selecting content corresponding to the specified multiple kinds of access related information on the basis of scenario definition information. The multiple kinds of access related information correspond to multiple contents that can be delivered on the game so that content to be delivered is selected in accordance with the scenario.

The method also includes delivering the selected content to the user terminal.

Moreover, still another aspect of the present invention is directed to a computer program product for causing an interactive content delivery server to interactively deliver content to a user terminal by selecting content to be delivered for supplying a game in which a scene is shifted in accordance with a predetermined scenario to the user terminal every time the user terminal accesses the interactive content delivery server, and delivering the selected content to be delivered to the user terminal via a communication network. The computer program product causes a computer (for example, the content delivery server 10) to execute steps including specifying multiple kinds of access related information relating to access by the user terminal when the interactive content delivery server is accessed from the user terminal.

The steps also include selecting content corresponding to the specified multiple kinds of access related information on the basis of scenario definition information in which the multiple kinds of access related information correspond to multiple contents that can be delivered on the game so that content to be delivered is selected in accordance with the scenario.

The steps also include delivering the selected content to the user terminal.

According to the present invention, it is possible to increase variation of a story on the game by changing content to be delivered in accordance with multiple kinds of situations that changes due to a user side on a game, and it is possible to maintain and improve a user's motivation and desire to continue playing the game. This makes it possible to provide a user participation type game that keeps a user interested in the game, or provides the user with an adequate sense of enjoyment while playing the game.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

FIG. 3 is an explanatory drawing that shows an example of storage information of a project master.

FIG. 4 is an explanatory drawing that shows an example of storage information of a place master.

FIG. 5 is an explanatory drawing that shows an example of storage information of a user history file.

FIG. 6 is an explanatory drawing that shows an example of storage information of a scenario definition file.

FIGS. 8A to 8F are explanatory drawings that show an example of content used in a game of a project code 01.

FIGS. 9A to 9E are explanatory drawings that show an example of content used in a game of a project code 01.

FIGS. 10A to 10E are explanatory drawings that show an example of content used in a game of a project code 02.

FIGS. 11A and 11B are explanatory drawings that show an example of content used in a game of a project code 02.

FIG. 13 is an explanatory drawing that shows an example of content used in a game of a project code 03.

DETAILED DESCRIPTION OF THE INVENTION

Preferred embodiments of an interactive content delivery server, a method and a computer program product for interactively delivering content according to the present invention will now be described in detail with reference to the appending drawings.

Figure 1:
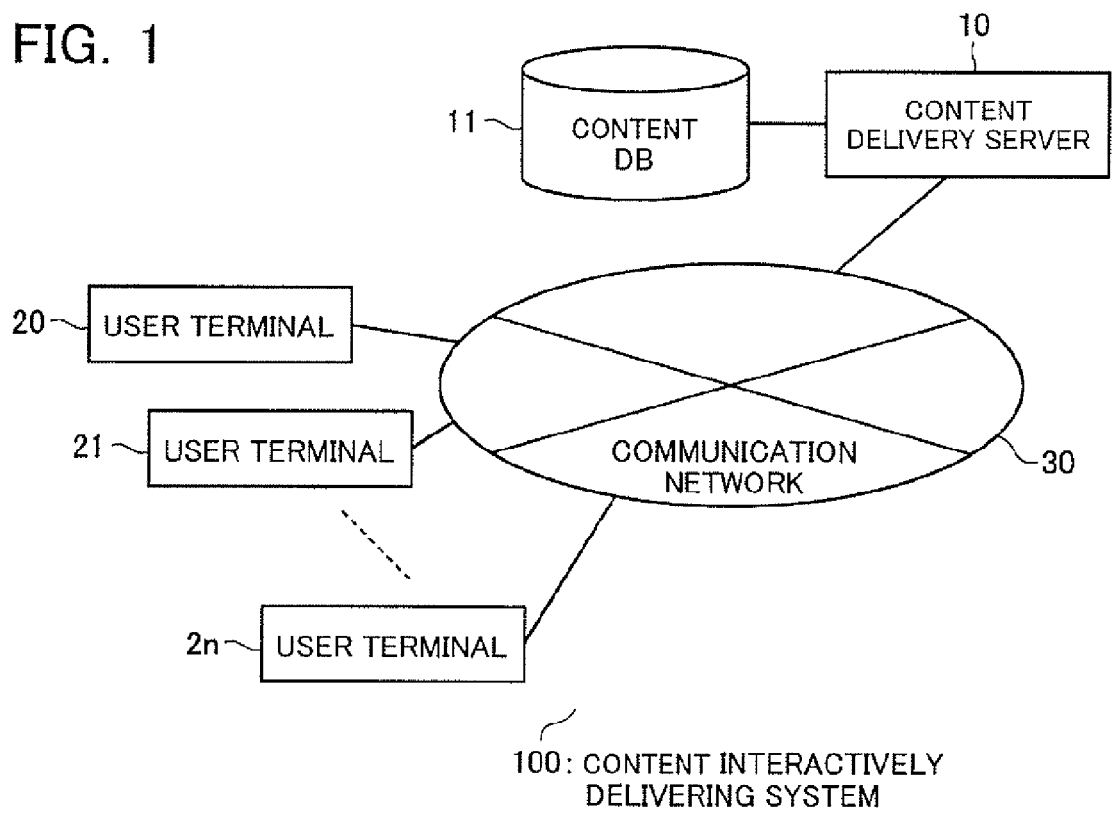
FIG. 1 is a block diagram that illustrates an example of configuration of an interactive content delivery system in an embodiment of the present invention.

FIG. 1 is a block diagram that illustrates an example of the configuration of an interactive content delivery system 100 in an embodiment according to an aspect of the present invention.

As shown in FIG. 1, the interactive content delivery system 100 of the present embodiment is constructed from a content delivery server 10, and multiple user terminals 20 to 2n (where "n" is an arbitrary positive integer number). The content delivery server 10 is provided with a content database (DB) 11 that stores various kinds of information including content that is to be delivered to supply a game to any of the user terminals 20 to 2n. In the game, a scene is shifted in accordance with a predetermined scenario. The content delivery server 10 is connected to each of the multiple user terminals 20 to 2n via a communication network 30 such as the Internet, or a local area network (LAN), or a wide area network (WAN), or the like, which maybe wired or wireless, as the skilled artisan will readily appreciate, without departing from the spirit or scope of the invention. In this case, the interactive content delivery system 100 may be constructed from the content delivery server 10 and one user terminal.

The content delivery server 10 is constructed from an information processing apparatus such as a WWW (World Wide Web) server, and is managed by a game supplier that supplies a game to any of the user terminals 20 to 2n by delivering content thereto.

The content DB 11 is constructed from an information storage medium such as a database apparatus. The content DB 11 stores various types of data such as content that is to be delivered to supply a game, a project master (see FIG. 3, which will be described later), and a place master (see FIG. 4, which will also be described later).

Each of the user terminals 20 to 2n is constructed from a personal computer or an information processing apparatus such as a portable information terminal (for example, a cellular phone terminal, a PDA (Personal Digital Assistance), a portable game apparatus and a home game apparatus), and is provided with software, such as a browser, and hardware to acquire content via the communication network 30.

Each user terminal may also include, for example, a GPS (Global Positioning System) receiver that derives a current position (latitude and longitude thereof) based signals from GPS satellites. The GPS receiver may be embedded in each of the user terminals 20 to 2n, or the GPS receiver may be a separate unit that is connectable (via wireless or wired communications) to the user terminal. Each of the user terminals 20 to 2n has a function to specify a current position thereof. In this regard, the method of specifying a current position is not limited to one using a GPS system, and the current position may be specified by other methods. For example, an IC (Integrated Chip) tag reader may be embedded in each of the user terminals 20 to 2n, and the current position of each of the user terminals 20 to 2n may be specified by reading positional information set in an IC tag that is provided at each place using the IC tag reader. Alternatively, a QR (Quick Response) code reader may be embedded in each of the user terminals 20 to 2n, and by reading a OR code printed in, for example, a poster that is stuck at each place using the QR code reader, positional information set in the QR code may be obtained, whereby the current position of each of the user terminals 20 to 2n may be specified. Each of the above described positioning devices may be embedded in the user terminal, or may be provided as a separate component that will convey a user terminal's position. If the positioning device is provided as a separate device, then the device may be configured to be attached to, for example, a player's hand, a hand control unit, or any other method by which a user terminal's position may be identified.

Figure 2:
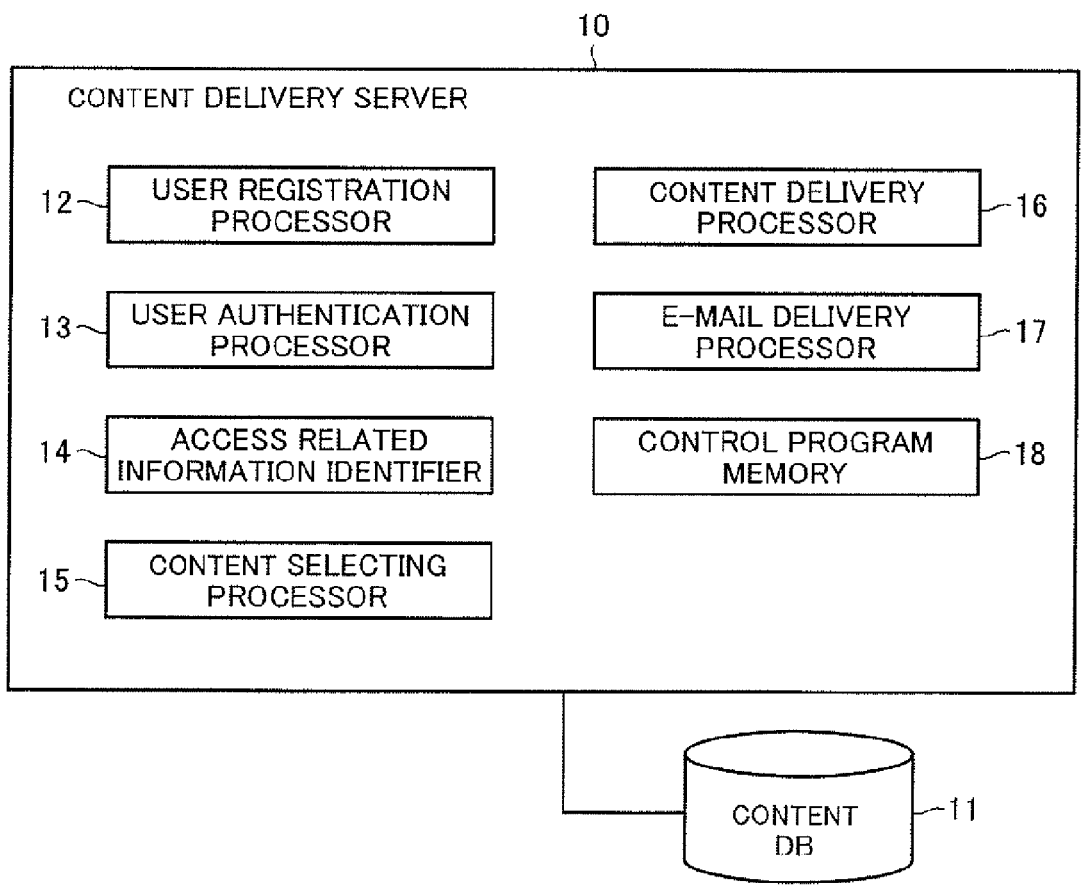
FIG. 2 is a block diagram that illustrates an example of configuration of a content delivery server.

FIG. 2 is a block diagram that illustrates an example of the configuration of the content delivery server 10. In this regard, components, other than the main components that are necessary for an understanding of the present invention, are omitted in FIG. 2. As illustrated in FIG. 2, the content delivery server 10 includes a user registration processor 12, a user authentication processor 13, an access related information identifier 14, a content selecting processor 15, a content delivery processor 16, an E-mail delivery processor 17, and a control program memory 18. Further, as described above, the content delivery server 10 is provided with the content DB 11 outside thereof. Alternatively, the content DB 11 may be embedded in the content delivery server 10.

The user registration processor 12 executes a process for carrying out user registration. More specifically, the user registration processor 12 executes a process for receiving various kinds of information relating to a user (for example, a full name, an address, a telephone number, an E-mail address, a user ID such as an individual identification number of a cellular phone terminal) from each of the user terminals 20 to 2n, and registering the received information along with a unique user code assigned to each user into the content DB 11 as user information.

The user authentication processor 13 executes a process for confirming whether any of the user terminals 20 to 2n is registered as a user or not by referring to the user information registered in the content DB 11 when any of the user terminals 20 to 2n requires use of content information stored in the content DB 11, thereby authenticating each of the user terminals 20 to 2n (or a user who manages each of the user terminals 20 to 2n). The user authentication is executed every session, for example. In this regard, the method of the user authentication may be any method that is capable of authenticating a user, but not limited to, for example, it may be a method using a UID (User Identification), or a method using a user code and/or a password, or user biometrics, such as fingerprints, retinal image recognition, image recognition, and voice recognition.

The access related information identifier 14 executes a process for identifying multiple kinds of access related information relating to access by each of the user terminals 20 to 2n, each of which is used for carrying out a predetermined game, when any of the user terminals 20 to 2n accesses the content delivery server 10. The "access related information" is information on access by the user terminal to the content delivery server 10 that each of the user terminals 20 to 2n carries out for carrying out a predetermined game. More specifically, the information on access of the user terminal to the content delivery server 10 includes a current position of each of the user terminals 20 to 2n that accesses the content delivery server 10, a period of time of access (access time) that each of the user terminals 20 to 2n accesses the content delivery server 10, a season of access (access season) by each of the user terminals 20 to 2n, a number of times (a number of accesses) that the content delivery server 10 is accessed by each of the user terminals 20 to 2n (including a number of times of access from a predetermined location, a number of times of access on a predetermined game, and a number of times at a predetermined period of time), and a frequency of access (access frequency) indicating frequency of access by each of the user terminals 20 to 2n to the content delivery server 10 (including an access frequency from a predetermined location, an access frequency on a predetermined game, and an access frequency at a predetermined period of time).

The content selecting processor 15 executes a process for selecting content to be delivered in accordance with the multiple kinds of access related information specified by the access related information specifier 14.

The content delivery processor 16 executes a process for delivering content selected by the content selecting processor 15 to a user terminal to be delivered (for example, a user terminal 20) via the communication network 30.

The E-mail delivery processor 17 executes a process for delivering an E-mail, in which various kinds of information are included, when predetermined E-mail delivery conditions are met. The E-mail delivery conditions may be met, for example, when a remaining period of time until a "game continuable period of time" elapses during which continuation of the game during execution is accepted becomes a predetermined period of time, or when the game continuable period of time of the game during execution elapses (a "game continuable period of time" is a predetermined period of time allowed for a game from the game's start to its finish, which is described later). The various kinds of information include information necessary for the game to progress (for example, information indicating a remaining period of time until the game continuable period of time elapses, and information indicating that the game continuable period of time has elapsed).

The control program memory 18 is constructed from a memory medium such as a ROM, which stores a control program for causing the content delivery server 10 to carry out various kinds of processes (that is, interactive content delivery program). Each section 12 to 17 of the content delivery server 10 carries out various kinds of processes in accordance with the control program stored in the control program memory 18.

FIG. 3 is an explanatory drawing that shows an example of storage information of a project master. In the present embodiment, project information in which project codes respectively applied to projects (or games) respectively correspond to project names (or game titles) predetermined with respect to the projects is set in the project master. The project master is generated by an administrator in advance and stored in the content DB 11.

Here, as shown in FIG. 3, a project code 01 "Shinsengumi Tour 2005", a project code 02 "Shinjuku Eating Out Campaign" and a project code 03 "Kobe Port Serial Murder Case" are set in the project master as the project information. In this regard, the projects shown in FIG. 3 are non-limiting examples that are provided for illustrative purposes only, and the skilled artisan will appreciate that any other project(s) may be included in the project master.

The project code 01 "Shinsengumi Tour 2005" is an example of a project in which a game proceeds by delivering content, which is used for guiding a user so that the user visits multiple predetermined places in a predetermined order, to any of the user terminals 20 to 2n in turn, whereby a scene on the game developed in any of the user terminals 20 to 2n is shifted.

The project code 02 "Shinjuku Eating Out Campaign" is an example of a project in which a game proceeds by appropriately delivering content, which is used for guiding a user so that the user visits multiple predetermined places in an arbitrary order, to any of the user terminals 20 to 2n, whereby a scene on the game developed in any of the user terminals 20 to 2n is shifted.

The project code 03 "Kobe Port Serial Murder Case" is an example of a project in which a game proceeds by appropriately delivering content, which is used for guiding a user so that the user visits any of multiple predetermined places and for generating different development in accordance with the place(s) that the user visited and/or the order of the user's visit and then for terminating the game when the user reaches a predetermined place, to any of the user terminals 20 to 2n, whereby a scene on the game developed in any of the user terminals 20 to 2n is shifted.

FIG. 4 is an explanatory drawing that shows an example of storage information of a place master. In the present embodiment, place information in which a place code set for a predetermined area in advance, area information indicating a place range specified by the place code, and a place name indicating a name specified by the place code correspond to each other is set for each of the project codes in the place master.

Places that a user is to visit in each of the projects, places that the user may visit and the like are selected in advance and set in the place information. As shown in FIG. 4, four places are set for the project code 01, and five places are set for the project code 02. In this regard, although multiple places are set for the project code 03, only one place is clearly shown in FIG. 4 for illustrative purposes, but it is understood that any number of project codes or places may be used as the skilled artisan will deem appropriate in implementing an aspect of the invention.

The area information is specified by, for example, combinations of four sets of latitude and longitude values. Namely, an area surrounded by four points that are respectively specified by the combinations of the four sets of latitude and longitude values corresponds to a place range that the corresponding place name indicates. In this regard, the area information may be information other than the combination of latitude and longitude values so long as it is information by which a place range that a corresponding place name indicates can be specified.

FIG. 5 is an explanatory drawing that shows an example of storage information of a user history file. User history information that corresponds to user codes respectively applied to users and progress information indicating progress of each of the projects is set in the user history file.

The progress information includes project codes indicating project(s) that a corresponding user has already carried out and project(s) that the corresponding user is currently carrying out. The progress information also includes a number of accesses indicating a number of times the corresponding user has accessed each place on each of the projects. As shown in FIG. 5, the number of accesses is set for each of the place codes respectively indicating the places.

In this case, although it is not shown in FIG. 5, the progress information may include other information such as an access date and time about each access to each place in each of the projects (for example, a part or all of an access month, an access date and an access time).

FIG. 6 is an explanatory drawing that shows an example of storage information of a scenario definition file. Scenario definition information that corresponds to the project code, a "place code" indicating a place for which corresponding content is to be selected, a "game continuable period of time" indicating a period of time to be allowed as a period of time spent from a start of a game to an end thereof, a "time zone" indicating a time zone for which corresponding content is to be selected, a "number of accesses" indicating a number of times of accesses for which corresponding content is to be selected, and content information for specifying content to be delivered, is set in the scenario definition file.

The content information is set as a content site name for identifying content or a combination of elements constituting content. In the present embodiment, the contents used in the project code 01 and the contents used in the project code 02 are respectively specified by content site names thereof. On the other hand, contents used in the project code 03 are specified by a combination of elements constituting each of the contents.

In the scenario definition file shown in FIG. 6, two or three of the "place code", the "time zone" and the "number of accesses" correspond to each content as multiple kinds of access related information. The multiple kinds of access related information set in the scenario definition file shown in FIG. 6 is a non-limiting example, and each of the contents that correspond to other multiple kinds of access related information may be set in the scenario definition file.

In this case, the content information set so as to correspond to each project code is not limited to the example shown in FIG. 6. Namely, content information other than the content information shown in FIG. 6 may be set so as to correspond to each project code.

Further, although it is not shown in FIG. 6, various kinds of content information that do not correspond to the multiple kinds of access related information (for example, content information indicating content to be delivered when a game continuable period of time elapses) set in the scenario definition file so as to correspond to each project code. In the scenario file, each condition for delivering content that content information indicates corresponds to each kind of the content information that does not correspond to the multiple kinds of access related information.

In the interactive content delivery system 100 of the present embodiment, every time there is access by each of the user terminals 20 to 2n, multiple kinds of access related information (for example, multiple kinds among a current position of the user terminal that accesses the content delivery server 10, a time zone of access, and a number of accesses) are specified by the content delivery server 10, and the content that corresponds to the specified access related information is selected to be delivered to each of the user terminals 20 to 2n. By causing the delivered content to display on a display device with which each of the user terminals 20 to 2n is provided, each user is encouraged to move and/or access the content delivery server 10 after moving.

In the interactive content delivery system 100 of the present embodiment, access related information relating to access by each of the user terminals 20 to 2n is specified, content that corresponds to the specified access related information is selected as content to be delivered, and then, the selected content is delivered. Thus, a story rich in variation can be developed on a game supplied to each of the user terminals 20 to 2n, and this makes it possible to maintain and improve a user's motivation and desire to continue playing the game. Therefore, it can be achieved to provide a user participation type game that keeps a user interested in the game, or provides the user with an adequate sense of enjoyment while playing the game.

Figure 7:
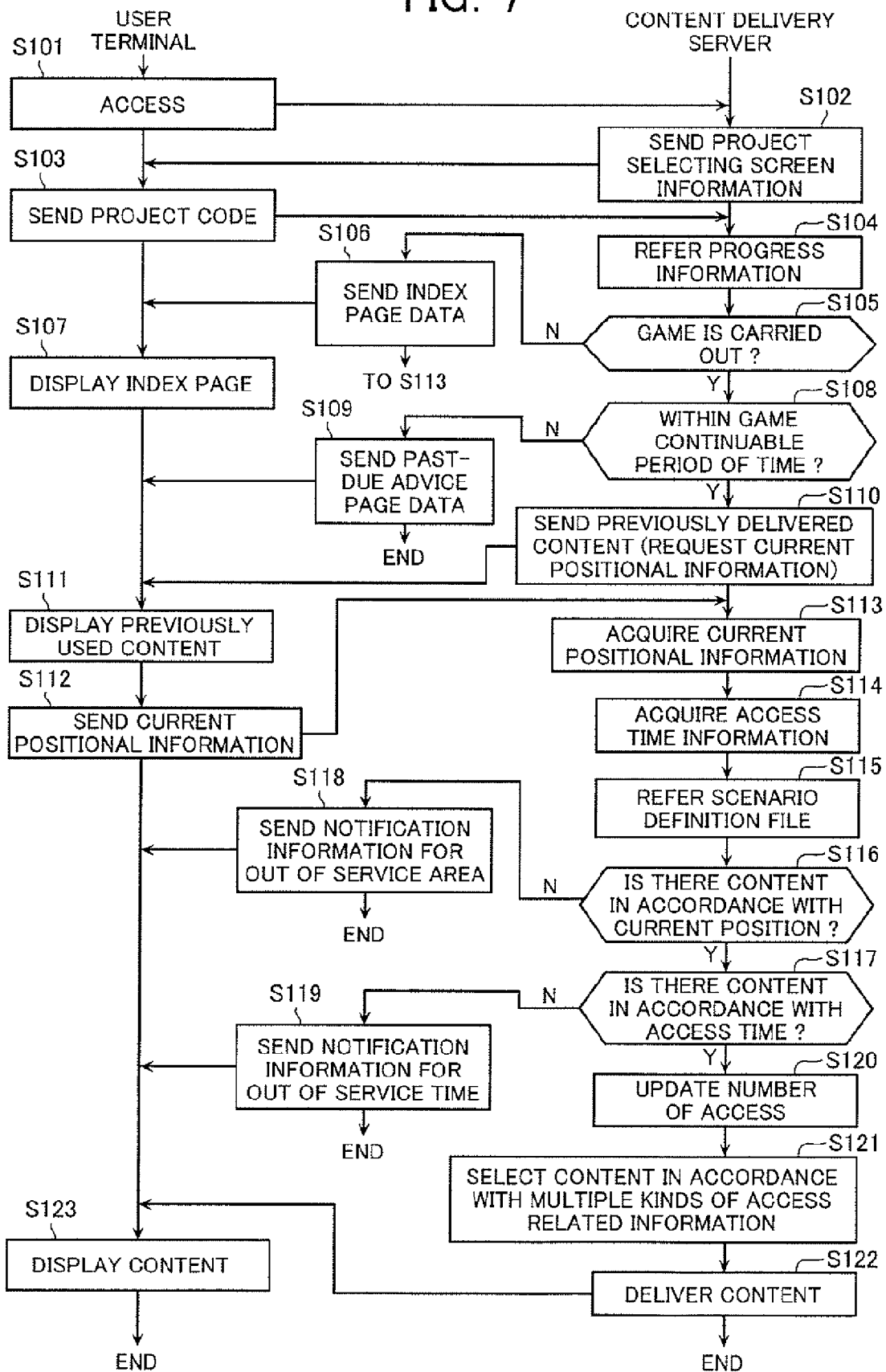
FIG. 7 is a flowchart that illustrates an example of an interactive content delivery process executed in an interactive content delivery system of an embodiment of the present invention.

Next, operation of the interactive content delivery system 100 according to the present embodiment will now be described. FIG. 7 is a flowchart that illustrates an example of an interactive content delivery process executed in the interactive content delivery system 100 of an embodiment of the present invention. Here, in order to simplify the explanation, it is assumed that a user X carries out any one of the games of the projects 01 to 03 using a user terminal 20 that has already been registered as a user (or user terminal). Further, in this example, it is assumed that the user terminal 20 is a cellular phone terminal, and user authentication is carried out at every session, but details of a process relating to the user authentication are omitted in order to simplify the explanation.

In the interactive content delivery process, the user terminal 20 first accesses the content delivery server 10 in accordance with an operation by the user X (Step S101). At Step S101, the user terminal 20 accesses, for example, a URL of a website that the content delivery server 10 previously established.

In this regard, at Step S101, the user terminal 20 may access a URL set in a QR code that the user terminal 20 reads. In this case, for example, a poster or the like may be put up at a place that a user may visit in the game, and the QR code may be printed on the poster.

When there is access by the user terminal 20, the content delivery server 10 carries out an authentication process for the user terminal 20. The interactive content delivery server 10 then sends project selecting screen information for displaying a project selecting screen on a display device of the user terminal 20 to the user terminal 20 via the communication network 30 (Step S102).

When the user terminal 20 receives the project selecting screen information, the user terminal 20 displays a project selecting screen that the project selecting screen information thus received indicates on the display device with which the user terminal 20 itself is provided. The project selecting screen includes a display region for displaying a list of project names of projects (games) that can be provided as a service. A project to be newly carried out or a project that is being currently carried out is selected by selecting any one of the project names displayed on the project selecting screen in accordance with an operation by the user X on an input device with which the user terminal 20 is provided (for example, buttons with which the cellular phone terminal is provided).

When a new or currently carried-out project is selected, the user terminal 20 sends a project code that corresponds to the selected project name to the content delivery server 10 (Step S103).

When the project code is received, the content delivery server 10 refers to progress information in a user history file (Step S104), and determines whether the selected project (game) is currently carried out on the user terminal 20 or not (Step S105). At Step S105, for example, in the case where it is confirmed that the received project code is included in the progress information and there is a place for which a number of accesses becomes zero, the content delivery server 10 determines that the selected project is currently carried out.

In the case where it is determined that the selected project is not currently carried out on the user terminal 20, the content delivery server 10 sends index page data for the selected project to the user terminal 20 (Step S106). When the index page data are received, the user terminal 20 displays an index page that the received index page data indicates (for example, see FIG. 8A) on the display device of the user terminal 20 (Step S107). The index page may include, for example, a guide display region in which guides relating to rules and stories of the game are displayed, and a movement instruction display region in which movement instruction for encouraging the user X to move to a start point of the game is displayed.

On the other hand, in the case where it is determined that the selected project is currently carried out on the user terminal 20, the content delivery server 10 refers to a scenario definition file. Then, in the case where a game continuable period of time is set for the selected project, it is determined whether the game continuable period of time elapses or not (Step S108). In the case where it is determined that the continuable period of time has elapsed, the content delivery server 10 sends past-due advice page data to the user terminal 20 (Step S109). When the past-due advice page data are received, the user terminal 20 displays a past-due advice page that the past-due advice page data thus received indicates on the display device with which the user terminal 20 is provided. The past-due advice page includes a past-due advice display region for informing the user X that the game continuable period of time for the selected project has already elapsed.

In the case where a game continuable period of time is not defined, or where it is determined that the continuable period of time does not elapse, the content delivery server 10 sends content data that was previously sent (or delivered) to the user terminal 20 (Step S110). When the content data are received, the user terminal 20 displays a content (page) that the received content data indicates on the display device of the user terminal 20 (Step S111). The displayed content includes a display region in which it is displayed that current positional information is sent at a place moved from a place of previous access.

In the case where the user terminal 20 is instructed to send current positional information to the content delivery server 10 in accordance with an operation by the user X (for example, using the input device at the user terminal 20) when content of either the index page or the previously displayed content is displayed at Step S107 or Step S111, the user terminal 20 sends the current positional information to the content delivery server 10 (Step S112). At Step S112, for example, current positional information (latitude and longitude), which indicates a current position obtained by a GPS receiver that is mounted on the user terminal 20, is sent to the content delivery server 10.

When the current positional information is received (Step S113), the content delivery server 10 acquires time information indicating a time when the current positional information is received as access time information indicating the time when there is access by the user terminal 20 (Step S114). In this regard, a time when the user terminal 20 accesses the content delivery server 10 may be acquired as the access time information, or a time when the content delivery server receives access by the user terminal 20 may be acquired as the access time information.

Subsequently, the content delivery server 10 refers to a scenario definition file (Step S115), and determines whether there is content corresponding to a position indicated by the current positional information acquired at Step S113 or not (Step S116). In the case where it is determined that there is the content corresponding to the position that the current positional information indicates, the content delivery server 10 determines whether any time zone corresponds to all of the contents and content, to which a time zone including the time indicated by the access time information that was acquired at Step S114 correspond, do not exist in the above content (Step S117).

In the case where it is determined at Step S116 that there is no content corresponding to the position indicated by the current positional information acquired at Step S113, the content delivery server 10 sends notification information for out of a service area, which is used for informing the user X that there is no content corresponding to the position that the current positional information acquired at Step S113 indicates, to the user terminal 20 (Step S118) When the notification information for out of a service area is received, the user terminal 20 carries out a process to display a notification screen for out of a service area that the notification information for out of a service area indicates on the display device. The notification screen for out of a service area includes a display region for displaying that the current position is out of a service area.

Further, in the case where it is determined at Step S117 that any time zone corresponds to all of the contents and content, to which a time zone including the time indicated by the access time information that has been acquired at Step S114 correspond, do not exist in the above content, the content delivery server 10 sends notification information for out of a service time, which is used to inform the user X that there is no content corresponding to the time that the access time information acquired at Step S114 indicates, to the user terminal 20 (Step S119). When the notification information for out of a service time is received, the user terminal 20 carries out a process to display a notification screen for out of a service time that the notification information for out of a service time indicates on the display device. The notification screen for out of a service time includes a display region for displaying that the current time is out of a service time.

In the case where it is determined that the current position is not out of a service area and the current time is not out of a service time in spite that any time zone corresponds to all of the contents corresponding to the current position, the content delivery server 10 refers to the progress information in the user history file, and updates the number of accesses at the position that the current positional information acquired at Step S113 (for example, by adding one to the corresponding number of accesses) (Step S120).

Subsequently, the content delivery server 10 selects content to be delivered in accordance with two or three kinds of access related information within the current positional information acquired at Step S113, the access time information acquired at Step S114 and the number of accesses updated at Step S120 (Step S121).

The content delivery server 10 then delivers the content selected at Step S121 to the user terminal 20 via the communication network 30 (Step S122).

When the content is received, the user terminal 20 displays a screen that the received content indicates on the display device (Step S123).

By repeatedly carrying out the processes from Step S101 to Step S123 every time the user X moves with the user terminal 20, a game in which a scene is shifted in accordance with a predetermined scenario is delivered to the user terminal 20.

As explained above, in one embodiment described above, the interactive content delivery system 100 is constructed so that in a game in which a scene is shifted in accordance with a predetermined scenario, a content may be selected and delivered to the user terminal in accordance with multiple kinds of access related information relating to access by a user terminal. Thus, it is possible to change content to be delivered in accordance with the multiple kinds of access related information, and this makes it possible to increase variation of a story on the game. Therefore, it is possible to maintain and improve a user's motivation and desire to continue playing the game. It is also possible to expect an increase in a number of accesses to the game by users. Further, it is possible to provide a user participation type game that keeps a user interested in the game, or provides the user with an adequate sense of enjoyment while playing the game compared with the case where content to be delivered is selected in accordance with only one kind of access related information such as current positional information of a user terminal.

In this regard, in the exemplary embodiment described above, current positional information indicating a current position of a user terminal, a number of accesses indicating a number of times the user accesses a content delivery server 10 on the game, an access time indicating a time when there is access by the user terminal and the like have been mainly mentioned as examples of access related information, other information relating access such as an access season indicating a season in which the user terminal 20 accesses the content delivery server 10, and an access frequency indicating a frequency of access of the user terminal on the game may be used as the access related information. In the case where the interactive content delivery system is constructed so that a content to be delivered is selected in accordance with the access related information including the access frequency, for example, it may be constructed so as to deliver content in which a reaction of each of characters on the game (person and animal) is changed in accordance with the access frequency (for example, content may be delivered as follows: The higher the access frequency is, the better a relationship between a user and the characters becomes. On the other hand, the lower the access frequency is, the worse a relationship between a user and the characters becomes.). This makes it possible to provide a user participation type game having rich variation.

Further, in the embodiment described above, although current positional information indicating a current position of the user terminal 20 has been mentioned as an example of the access related information, a number of other content readers positioned around the user terminal 20 when the user accesses the content delivery server 10 may be used as the access related information. For example, it is thought that a wireless LAN function may be mounted on the user terminal 20, and development of a story will become better in the case where more users read the same content when the user terminal 20 carries out a wireless communication with other terminals that are in the vicinity of the user terminal 20. For example, the user of the user terminal 20 can obtain many hints, or supporters to the user of the user terminal 20 increase. Moreover, in the case where there is a user in the vicinity of the user terminal 20 who reads the same content, a content may be delivered in which a character that does not appear unless there is a user in the vicinity of the user terminal 20 who reads the same content appears on the game. Thus, it is possible to further increase variation of a story on the game.

In this regard, in the exemplary embodiment described above, although the previously delivered content is delivered when there is access by a user terminal except for first time access, other contents such as content used for display to request transmission of positional information may be delivered.

Further, in the exemplary embodiment described above, control programs for causing the content delivery server 10 to execute various processes as described above are stored in the control program memory 18. However, the control programs may be delivered to the user terminal 20 by a server apparatus such as a WWW server. In this case, the content delivery server 10 may acquire the control programs delivered by the server apparatus via the communication network 30, and store the control programs in the control program memory 18 constituted from a RAM.

EXAMPLE

Example 1

Hereinafter, a first example of the embodiment according to the present invention will be described.

Here, an exemplary operation of the interactive content delivery system 100 will be described with reference to the flowchart of FIG. 7 when the user X carries out a game of the project code 01 using the user terminal 20 that has been registered as a user. In this regard, the operation will be explained so as to omit processes, which are not carried out when carrying out the game of the project code 01, within the processes shown in FIG. 7. Further, in this case, the user X has not yet carried out the game of the project code 01 using the user terminal 20.

In the interactive content delivery process, when there is access by the user terminal 20 (Step S101), the content delivery server 10 carries out an authentication process for the user terminal 20, and then sends project selecting screen information for displaying a project selecting screen on a display device of the user terminal 20 to the user terminal 20 via the communication network 30 (Step S102).

The user terminal 20 displays the project selecting screen on the basis of the project selecting screen information thus received on the display device. Here, in accordance with an operation by the user X on the input device, a project "SHINSENGUMI TOUR 2005" of the project code 01 is selected from multiple projects displayed on the project selecting screen. When the project "SHINSENGUMI TOUR 2005" is selected, the user terminal 20 sends the project code 01 that corresponds to the selected project "SHINSENGUMI TOUR 2005" to the content delivery server 10 (Step S103).

When the project code 01 is received, the content delivery server 10 refers to progress information in a user history file (Step S104), and confirms that the project "SHINSENGUMI TOUR 2005" of the selected project code 01 is not currently carried out on the user terminal 20 (Step S105). The content delivery server 10 then sends index page data of the selected project "SHINSENGUMI TOUR 2005" to the user terminal 20 (Step S106). When the index page data are received, the user terminal 20 displays an index page that the received index page data indicates (FIG. 8A) on the display device (Step S107).

As shown in FIG. 8A, the index page includes a display region in which a title of the project "Shinsengumi Tour", guidance for a period of time when the user X can participate in the game, movement instruction for encouraging the user X to move to "Takahatafudou station" that is a start point of the game, and access instruction for instructing access at a moved point are displayed.

The user X moves to "Takahatafudou station" from a current position in accordance with the movement instruction of the index page, and again accesses the content delivery server 10 (Step S101). Then, the processes from Step S102 to Step S107 are carried out in the same manner as described above, the index page (FIG. 8A) is displayed on the display device of the user terminal 20. Subsequently, when it is specified that current positional information is sent in accordance with an operation by the user X on the input device of the user terminal 20 (for example, selection of "Send your positional information." in FIG. 8A), the user terminal 20 sends the current positional information to the content delivery server 10 (Step S112). Here, at Step S112, current positional information indicating a position within a predetermined area in which "Takahatafudou station" is positioned is sent to the content delivery server 10.

When the current positional information is received from the user terminal 20 (Step S113), the content delivery server 10 acquires access time information indicating a time when there is access by the user terminal 20 (Step S114). Here, the time that the access time information indicates is 9:30 AM.

Subsequently, the content delivery server 10 refers to the scenario definition file (Step S115), and confirms that there is content corresponding to the position (PL01 (see FIG. 4)) that the current positional information acquired at Step S113 indicates (Step S116). Then, the content delivery server 10 confirms that any time zone corresponds to all of the contents and content, to which a time zone including the time indicated by the access time information that has been acquired at Step S114 correspond, exist in the above content (Step S117).

As described above, after it is determined that the current position is not out of a service area and the current time is not out of a service time in spite that any time zone corresponds to all of the contents corresponding to the current position, the content delivery server 10 refers to the progress information in the user history file, and updates the number of accesses at the position that the current positional information acquired at Step S113 (that is, adds one to the corresponding number of accesses) (Step S120).

Subsequently, the content delivery server 10 selects content to be delivered in accordance with three kinds of access related information, that is, the current positional information acquired at Step S113, the access time information acquired at Step S114 and a number of accesses (more specifically, a total number of accesses of all users at the same place including a number of accesses updated at Step S120) (Step S121). The content delivery server 10 then delivers the content selected at Step S121 to the user terminal 20 via the communication network 30 (Step S122). Here, content corresponding to a content site name "fudouekishuhen.html" is selected and delivered.

When the content is received, the user terminal 20 displays the received content of the content site name "fudouekishuhen.html" (FIG. 8B). The content shown in FIG. 8B includes a display region in which a tour course to visit in turn on the game, a time required, guidance that it is possible to obtain a gift by clear of the game, movement instruction for encouraging the user X to move to "Takahatatudouson" that is a next visiting point, and access instruction for instructing access at a moved point are displayed.

The user X moves to "Takahatafudouson" in accordance with the movement instruction of the content of the content site name "fudouekishuhen.html", and again accesses the content delivery server 10 (Step S101). Then, the processes from Step S102 to Step S104 are carried out in the same manner as described above, the content delivery server 10 determines at Step S105 that the project "SHINSENGUMI TOUR 2005" is currently carried out, and sends the previously delivered content data to the user terminal 20 (Step S110). When the content data are received, the user terminal 20 displays the content that the received content data indicate (that is, the content of the content site name "fudouekishuhen.html") on the display device (Step S111) The displayed content includes a display region in which instruction information for instructing to send current positional information at moved place "Takahatafudouson" that is moved from previously accessed position is displayed.

When the content of the content site name "fudouekishuhen.html" are displayed, the user X is positioned at "Takahatafudouson". Here, when it is specified that current positional information is sent in accordance with an operation by the user X on the input device of the user terminal 20 (for example, selection of "Move to Takahatafudouson." in FIG. 8B), the user terminal 20 sends the current positional information to the content delivery server 10 (Step S112).

When the current positional information is received (Step S113), the content delivery server 10 acquires access time information indicating a time when there is access by the user terminal 20 (Step S114). Here, the time that the access time information indicates is 11:30 AM.

Subsequently, the content delivery server 10 refers to the scenario definition file (Step S115), and confirms that there is content corresponding to the position (PL02 (see FIG. 4)) that the current positional information acquired at Step S113 indicates (Step S116). Then, the content delivery server 10 confirms that any time zone corresponds to all of the contents and content, to which a time zone including the time indicated by the access time information that has been acquired at Step S114 correspond, exist in the above content (Step S117).

As described above, since it is determined that the current position is not out of a service area and the current time is not out of a service time in spite that any time zone corresponds to all of the contents corresponding to the current position, the content delivery server 10 refers to the progress information in the user history file, and updates the number of accesses at the position that the current positional information acquired at Step S113 (for example, by adding one to the corresponding number of accesses) (Step S120).

Subsequently, the content delivery server 10 selects content to be delivered in accordance with three kinds of access related information, that is, the current positional information acquired at Step S113, the access time information acquired at Step S114 and a number of accesses (more specifically, a total number of accesses of all users at the same place including a number of accesses updated at Step S120 (Step S121). The content delivery server 10 then delivers the content selected at Step S121 to the user terminal 20 via the communication network 30 (Step S122). Here, content corresponding to a content site name "fodouson1hiru.html" or a content site name "fodouson2hiru.html" is selected in accordance with the number of accesses and delivered.

As for a time zone of daytime (from 6 AM to 5 PM) at "Takahatafudouson" in the project "SHINSENGUMI TOUR 2005", in the case where this access was initial access, content of the content site name "fudouson1hiru.html" is selected and delivered. On the other hand, in the case where this access was second access or more, content of the content site name "fudouson2hiru.html" is selected and delivered. Whether this access was initial access or not is carried out as follows. Namely, the content delivery server 10 refers to the user history file and confirms whether a total number of times for all users of access in daytime time zone from "Takahatafudouson" in the project code 01 is "1" or not. Thus, in the present example, the user history file is constituted so as to able to manage the number of accesses in each of time zones.

In the case where the content of the content site name "fudouson1hiru.html" is selected and delivered, the user terminal 20 displays the received content of the content site name "fudouson1hiru.html" (FIG. 8C). The content shown in FIG. 8C includes a display region in which a description of Takahatafudouson that is a visited place, a tour course to visit in turn on the game, a remaining time required, neighboring information (including nearest shops), a link to special information that is applied to an initially accessing user, movement instruction for encouraging the user X to move to "Toshizo Hijikata Museum" that is a next visiting point, and access instruction for instructing access at a moved point are displayed.

In this regard, when the link to special information that is applied to an initially accessing user is selected, the user terminal 20 can obtain special information, for example, a detailed description of "Takahatafudouson" and a discount coupon for a neighboring restaurant.

In the case where the content of the content site name "fudouson2yoru.html" is selected and delivered, the user terminal 20 displays the received content of the content site name "fudouson2yoru.html" (FIG. 8D). The content shown in FIG. 8D includes a display region in which a description of Takahatafudouson that is a visited place, a tour course to visit in turn on the game, a remaining time required, neighboring information (including nearest shops), movement instruction for encouraging the user X to move to "Toshizo Hijikata Museum" that is a next visiting point, and access instruction for instructing access at a moved point are displayed.

As for a time zone of nighttime (from 5 PM to 12 AM) at "Takahatafudouson" in the project "SHINSENGUMI TOUR 2005", in the case where this access was initial access, content of the content site name "fudouson1yoru.html" is selected and delivered. On the other hand, in the case where this access was second access or more, content of the content site name "fudouson2yoru.html" is selected and delivered.

In the case where the content of the content site name "fudouson1yoru.html" is selected and delivered, the user terminal 20 displays the received content of the content site name "fudouson1yoru.html" (FIG. 8E). The content shown in FIG. 8E includes a display region in which a description of Takahatafudouson that is a visited place, a tour course to visit in turn on the game, a remaining time required, neighboring information (including nearest shops), a link to special information that is applied to an initially accessing user, movement instruction for encouraging the user X to move to "Toshizo Hijikata Museum" that is a next visiting point, and access instruction for instructing access at a moved point are displayed.

In the case where the content of the content site name "fodouson2yoru.html" is selected and delivered, the user terminal 20 displays the received content of the content site name "fodouson2yoru.html" (FIG. 8F). The content shown in FIG. 8F includes a display region in which a description of Takahatafudouson that is a visited place, a tour course to visit in turn on the game, a remaining time required, neighboring information (including nearest shops), movement instruction for encouraging the user X to move to "Toshizo Hijikata Museum" that is a next visiting point, and access instruction for instructing access at a moved point are displayed.

As described above, in the present example, different contents depending upon the initially accessing user or other user are delivered, and different contents depending upon the daytime time zone or the nighttime time zone are delivered.

The user X moves to "Toshizo Hijikata Museum" in accordance with the movement instruction of the content of the content site name "fodouson1hiru.html", and again accesses the content delivery server 10 (Step S101). Then, the processes at Steps S102 to S105 and S108 are carried out in the same manner as described above, the content delivery server 10 sends the previously delivered contents data to the user terminal 20 (Step S110). When the content data are received, the user terminal 20 displays the content that the received content data indicate (that is, the content of the content site name "fodouson1hiru.html") on the display device (Step S111). The displayed content includes a display region in which instruction information for instructing to send current positional information at moved place "Toshizo Hijikata Museum" that is moved from previously accessed position is displayed.

When the content of the content site name "fodouson1hiru.html" is displayed, the user X is positioned at "Toshizo Hijikata Museum". Here, when it is specified that current positional information is sent in accordance with an operation by the user X on the input device of the user terminal 20 (for example, selection of "Move to Toshizo Hijikata Museum." in FIG. 8C), the user terminal 20 sends the current positional information to the content delivery server 10 (Step S112). In this case, at Step S112, current positional information indicating a position within a predetermined area in which "Toshizo Hijikata Museum" is positioned is sent to the content delivery server 10.

When the current positional information is received (Step S113), the content delivery server 10 acquires access time information indicating a time when there is access by the user terminal 20 (Step S114). Here, the time that the access time information indicates is 1:30 PM.

Subsequently, the content delivery server 10 refers to the scenario definition file (Step S115), and confirms that there is content corresponding to the position (PL03 (see FIG. 4)) that the current positional information acquired at Step S113 indicates (Step S116). Then, the content delivery server 10 confirms that any time zone corresponds to all of the contents and content, to which a time zone including the time indicated by the access time information that has been acquired at Step S114 correspond, exist in the above content (Step S117).

As described above, since it is determined that the current position is not out of a service area and the current time is not out of a service time in spite that any time zone corresponds to all of the contents corresponding to the current position, the content delivery server 10 refers to the progress information in the user history file, and updates the number of accesses at the position that the current positional information acquired at Step S113 (that is, adds one to the corresponding number of accesses) (Step S120).

Subsequently, the content delivery server 10 selects content to be delivered in accordance with three kinds of access related information, that is, the current positional information acquired at Step S113, the access time information acquired at Step S114 and a number of accesses (more specifically, a total number of accesses of all users at the same place including a number of accesses updated at Step S120 (Step S121). The content delivery server 10 then delivers the content selected at Step S121 to the user terminal 20 via the communication network 30 (Step S122). Here, content corresponding to a content site name "hijikata.html" is selected and delivered.

In the case where the content of the content site name "hijikata.html" is selected and delivered, the user terminal 20 displays the received content of the content site name "hijikata.html" (FIG. 9A). The content shown in FIG. 9A includes a display region in which a description of Toshizo Hijikata Museum that is a visited place, a tour course to visit in turn on the game, a remaining time required, neighboring information (including nearest shops), movement instruction for encouraging the user X to move to "Yasaka Shinto Shrine" that is a next visiting point, and access instruction for instructing access at a moved point are displayed.

The user X moves to "Yasaka Shinto Shrine" in accordance with the movement instruction of the content of the content site name "hijikata.html", and again accesses the content delivery server 10 (Step S101). Then, the processes at Steps S102 to S105 and S108 are carried out in the same manner as described above, the content delivery server 10 sends the previously delivered content data to the user terminal 20 (Step S110). When the content data are received, the user terminal 20 displays the content that the received content data indicate (that is, the content of the content site name "hijikata.html") on the display device (Step S111). The displayed content includes a display region in which instruction information for instructing to send current positional information at moved place "Yakasa Shinto Shrine" that is moved from previously accessed position is displayed.

When the content of the content site name "hijikata.html" is displayed, the user X is positioned at "Yasaka Shinto Shrine". Here, when it is specified that current positional information is sent in accordance with an operation by the user X on the input device of the user terminal 20 (for example, selection of "Move to Yasaka Shinto Shrine." in FIG. 9A), the user terminal 20 sends the current positional information to the content delivery server 10 (Step S112).

When the current positional information is received (Step S113), the content delivery server 10 acquires access time information indicating a time when there is access by the user terminal 20 (Step S114). Here, the time that the access time information indicates is 3:30 PM.

Subsequently, the content delivery server 10 refers to the scenario definition file (Step S115), and confirms that there is content corresponding to the position (PL04 (see FIG. 4)) that the current positional information acquired at Step S113 indicates (Step S116). Then, the content delivery server 10 confirms that any time zone corresponds to all of the contents and content, to which a time zone including the time indicated by the access time information that has been acquired at Step S114 correspond, exist in the above content (Step S117).

As described above, since it is determined that the current position is not out of a service area and the current time is not out of a service time in spite that any time zone corresponds to all of the contents corresponding to the current position, the content delivery server 10 refers to the progress information in the user history file, and updates the number of accesses at the position that the current positional information acquired at Step S113 (that is, adds one to the corresponding number of accesses) (Step S120).

Subsequently, the content delivery server 10 selects content to be delivered in accordance with three kinds of access related information, that is, the current positional information acquired at Step S113, the access time information acquired at Step S114 and a number of accesses (more specifically, a total number of accesses of all users at the same place including a number of accesses updated at Step S120 (Step S121). The content delivery server 10 then delivers the content selected at Step S121 to the user terminal 20 via the communication network 30 (Step S122). Here, content corresponding to a content site name "yasakahiru.html" is selected and delivered.

In the case where the content of the content site name "yasakahiru.html" is selected and delivered, the user terminal 20 displays the received content of the content site name "yasakahiru.html" (FIG. 9B). The content shown in FIG. 9B includes a display region in which a description of Yasaka Shinto Shrine that is a final visited place of the present example, a tour course to visit in turn on the game, neighboring information (including nearest shops), and a link to obtain a privilege in the case of going around all the tour course are displayed.

In the case where the content of the content site name "yasakayoru.html" is selected and delivered, the user terminal 20 displays the received content of the content site name "yasakahiru.html" (FIG. 9C). The content shown in FIG. 9C includes a display region in which a description of Yasaka Shinto Shrine that is a final visited place of the present example, a tour course to visit in turn on the game, neighboring information (including nearest shops), and a link to obtain a privilege in the case of going around the entire tour course are displayed.

Figure 9D:
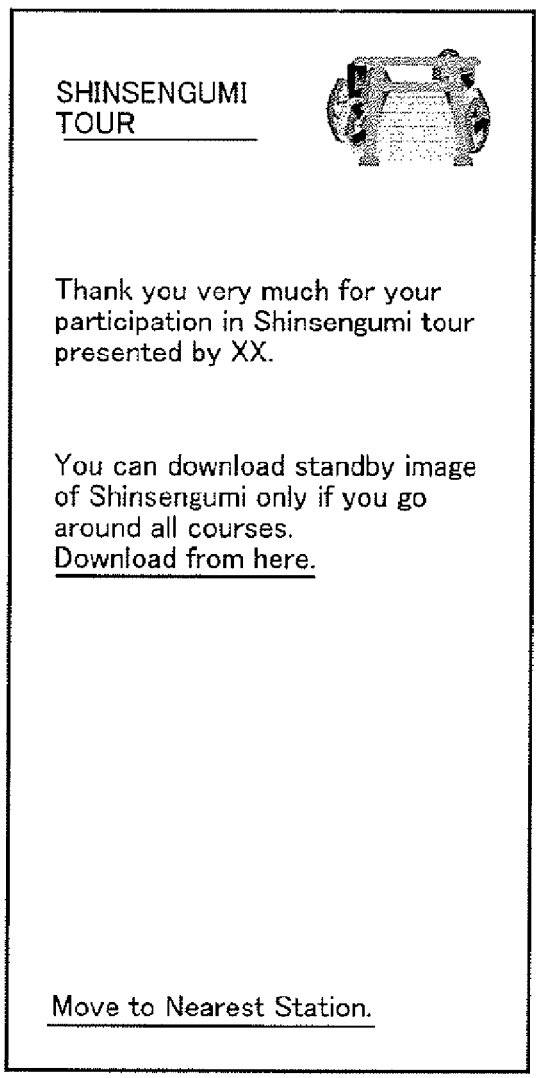
Figure 9E:
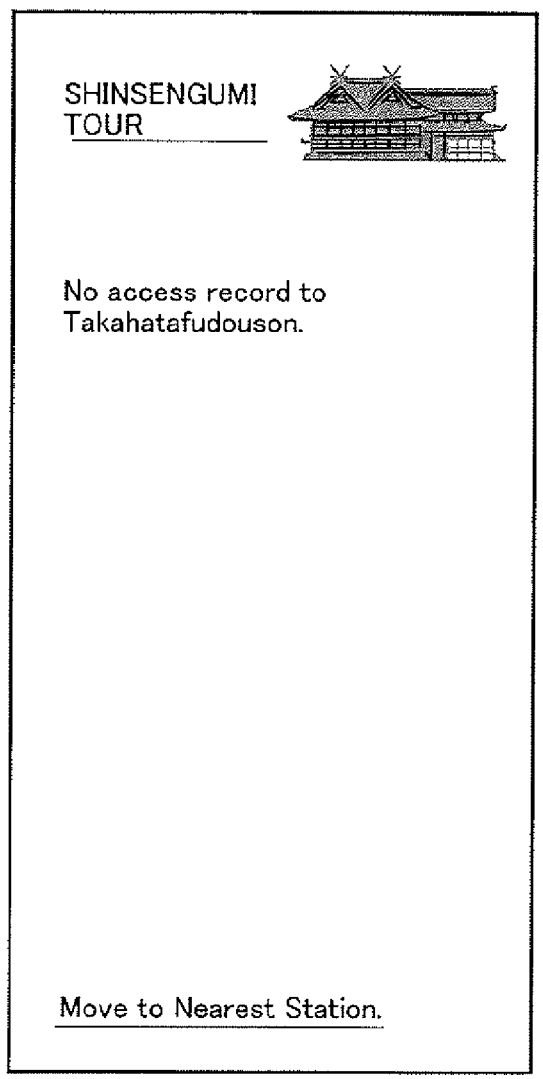

In this regard, in the case where the link is selected when going around the entire tour course, in the present example, content shown in FIG. 9D is delivered to the user terminal 20 to allow a standby screen to be acquired as the privilege. On the other hand, in the case where the link is selected when not going around the entire tour courser for example, content shown in FIG. 9E is delivered to the user terminal 20.

As described above, in the first example, the interactive content delivery system 100 is constructed so that in a game in which a scene is shifted in accordance with a predetermined scenario, content to be delivered in accordance with three kinds of access related information relating to access by a user terminal (that is, current positional information, access time information, and a number of accesses) is selected and delivered to the user terminal 20. Thus, it is possible to change contents to be delivered in accordance with the three kinds of access related information, and this makes it possible to increase variation of a story on the game. Therefore, it is possible to maintain and improve a user's motivation and desire to continue playing the game. Further, it is possible to provide a user participation type game that keeps a user interested in the game, or provides the user with an adequate sense of enjoyment while playing the game compared with the case where content to be delivered is selected in accordance with only one kind of access related information such as current positional information of a user terminal 20.

Example 2

Hereinafter, a second example of the embodiment according to the present invention will be described.

Here, an exemplary operation of the interactive content delivery system 100 will be described with reference to the flowchart of FIG. 7 when the user X carries out a game of the project code 02 using the user terminal 20 that has been registered as a user. In this regard, the operation will be explained so as to omit processes, which are not carried out when carrying out the game of the project code 02, within the processes shown in FIG. 7. Further, in this case, the user X has not yet carried out the game of the project code 02 using the user terminal 20.

In the interactive content delivery process, when there is access by the user terminal 20 (Step S101), the content delivery server 10 carries out an authentication process for the user terminal 20, and then sends project selecting screen information for displaying a project selecting screen on a display device of the user terminal 20 to the user terminal 20 via the communication network 30 (Step S102).

The user terminal 20 displays the project selecting screen on the basis of the project selecting screen information thus received on the display device. Here, in accordance with an operation by the user X on the input device, a project "SHINJUKU EATING OUT CAMPAIGN" of the project code 02 is selected from multiple projects displayed on the project selecting screen. When the project "SHINJUKU EATING OUT CAMPAIGN" is selected, the user terminal 20 sends the project code 02 that corresponds to the selected project "SHINJUKU EATING OUT CAMPAIGN" to the content delivery server 10 (Step S103).

When the project code 02 is received, the content delivery server 10 refers to progress information in a user history file (Step S104), and confirms that the project "SHINJUKU EAT-ING OUT CAMPAIGN" of the selected project code 02 is not currently carried out on the user terminal 20 (Step S105. In the present example, the content delivery server 10 acquires access time information, and determines whether index page data of the project "SHINJUKU EATING OUT CAMPAIGN" is set to daytime data (shinjuku-tabe-hiru.html) or nighttime data (shinjuku-tabe-yoru.html) in accordance with the scenario definition file. The content delivery server 10 then sends determined index page data to the user terminal 20 (Step S106). When the index page data are received, the user terminal 20 displays an index page that the received index page data indicates (FIG. 10A for daytime data, or FIG. 10B for nighttime data) on the display device (Step S107).

As shown in FIG. 10A, the index page includes a display region in which a title of the project "Shinjuku Eating Out Campaign", guidance for a period of time when the user X can participate in the game, guidance of each place that the user X is to visit on the game, movement instruction (guidance instruction), and a present location are displayed. In this example, the place to be visited includes "Sushi AA", "Japanese Food BB", "Italian cuisine CC", "Bar DD", and "Dessert EE".

The user X moves to any one of the places to be visited (here, the user X enters "Sushi AA") in accordance with the guidance of the index page, and again accesses the content delivery server 10 (Step S101). Then, the processes from Step S102 to Step S107 and the like are carried out in the same manner as described above, the index page (FIG. 10A for daytime data, or FIG. 10B for nighttime data) is displayed on the display device of the user terminal 20.

Subsequently, when it is specified that current positional information is sent in accordance with an operation by the user X on the input device of the user terminal 20 (for example, selection of "Sushi AA" in FIG. 10A), the user terminal 20 sends the current positional information to the content delivery server 10 (Step S112).

When the current positional information is received (Step S113), the content delivery server 10 refers to the scenario file (Step S115) and confirms that there is content corresponding to the position (PL01 (see FIG. 4)) that the current positional information acquired at Step S113 indicates (Step S116). Then, the content delivery server 10 refers to the progress information in the user history file, and updates the number of accesses at the position that the current positional information acquired at Step S113 (that is, adds one to the corresponding number of accesses) (Step S120).

Subsequently, the content delivery server 10 selects content to be delivered in accordance with two kinds of access related information, that is, the current positional information acquired at Step S113, and a number of accesses (more specifically, a total number of accesses of all users at the same place including a number of accesses updated at Step S120 (Step S121). The content delivery server 10 then delivers the content selected at Step S121 to the user terminal 20 via the communication network 30 (Step S122). Here, content corresponding to a content site name "sushi.html" is selected and delivered.

When the content is received, the user terminal 20 displays the received content of the content site name "sushi.html" (FIG. 10C). The content shown in FIG. 10C includes a display region in which restaurant information, privilege information, and movement instruction for encouraging the user X to move next restaurant are displayed.

Thereafter, the user X enters "Japanese Food BB" among remaining places to be visited, and again accesses the content delivery server 10 (Step S101). Then, the processes from Step S102 to Step S104 are carried out in the same manner as described above, the content delivery server 10 determines at Step S105 that the project "Shinjuku Eating Out Campaign" is currently carried out, and refers to the scenario definition file. In the case where a game continuable period of time does not elapse, the content delivery server 10 sends the previously delivered content data to the user terminal 20 (Step S110). In the present example, the user terminal 20 displays the content of the content site name "sushi.html" on the basis of the received content data on the display device (FIG. 10C).

When the content of the content site name "sushi.html" is displayed, the user X enters "Japanese Food BB". Here, when it is specified that current positional information is sent in accordance with an operation by the user X on the input device of the user terminal 20 (for example, selection of "Move to next restaurant." in FIG. 10C), the user terminal 20 sends the current positional information to the content delivery server 10 (Step S112).

When the current positional information is received (Step S113), the content delivery server 10 refers to the scenario file (Step S115) and confirms that there is content corresponding to the position (PL02 (see FIG. 4)) that the current positional information acquired at Step S113 indicates (Step S116). Then, the content delivery server 10 refers to the progress information in the user history file, and updates the number of accesses at the position that the current positional information acquired at Step S113 (that is, adds one to the corresponding number of accesses) (Step S120).

Subsequently, the content delivery server 10 selects content to be delivered in accordance with two kinds of access related information, that is, the current positional information acquired at Step S113, and a number of accesses (more specifically, a total number of accesses of all users at the same place including a number of accesses updated at Step S120 (Step S121). The content delivery server 10 then delivers the content selected at Step S121 to the user terminal 20 via the communication network 30 (Step S122). Here, content corresponding to a content site name "washoku.html" is selected and delivered.

When the content of the content site name "washoku.html" is received, the user terminal 20 displays the received content of the content site name "washoku.html" (FIG. 10D).

In the same manner as described above, when the user X enters "Italian cuisine CC" and sends current positional information to the content delivery server 10, content shown in FIG. 10E is displayed on the display device of the user terminal 20. Further, when the user X enters "Bar DD" and sends current positional information to the content delivery server 10, content shown in FIG. 11A is displayed on the display device of the user terminal 20. Moreover, when the user X enters "Dessert EE" and sends current positional information to the content delivery server 10, content shown in FIG. 11B is displayed on the display device of the user terminal 20.

In this regard, in the present example, in the case where the user X enters all of the restaurants, it is possible to download a discount coupon on the content in which information on a final restaurant is displayed by sending the current positional information at the final restaurant, thereby obtaining a privilege of discounts at the final restaurant.

As described above, in the second example, the interactive content delivery system 100 is constructed so that in a game in which a scene is shifted in accordance with a predetermined scenario, content to be delivered in accordance with two kinds of access related information relating to access by a user terminal (that is, current positional information, and a number of accesses) is selected and delivered to the user terminal. Thus, it is possible to change contents to be delivered in accordance with the two kinds of access related information, and this makes it possible to increase variation of a story on the game. Therefore, it is possible to maintain and improve a user's motivation and desire to continue playing the game. Further, it is possible to provide a user participation type game that keeps a user interested in the game, or provides the user with an adequate sense of enjoyment while playing the game compared with the case where content to be delivered is selected in accordance with only one kind of access related information such as current positional information of a user terminal.

Example 3

Hereinafter, a third example of the embodiment according to the present invention will be described.

Here, an exemplary operation of the interactive content delivery system 100 will be described with reference to the flowchart of FIG. 7 when the user X carries out a game of the project code 03 using the user terminal 20 that has been registered as a user. In this regard, the operation will be explained so as to omit processes, which are not carried out when carrying out the game of the project code 03, within the processes shown in FIG. 7. Further, in this case, the user X has not yet carried out the game of the project code 03 using the user terminal 20.

In this regard, although it is omitted in FIG. 6, in a project "Kobe Port Serial Murder Case" of the project code 03, progress information indicating progress of a game corresponds to a part or all of contents set in a scenario definition file. Namely, the interactive content delivery system 100 is constructed so that different contents are delivered depending upon the progress information.

In the interactive content delivery process, when there is access by the user terminal 20 (Step S101), the content delivery server 10 carries out an authentication process for the user terminal 20, and then sends project selecting screen information for displaying a project selecting screen on a display device of the user terminal 20 to the user terminal 20 via the communication network 30 (Step S102).

The user terminal 20 displays the project selecting screen on the basis of the project selecting screen information thus received on the display device. Here, in accordance with an operation by the user X on the input device, a project "Kobe Port Serial Murder Case" of the project code 03 is selected from multiple projects displayed on the project selecting screen. When the project "Kobe Port Serial Murder Case" is selected, the user terminal 20 sends the project code 03 that corresponds to the selected project "Kobe Port Serial Murder Case" to the content delivery server 10 (Step S103).

When the project code 03 is received, the content delivery server 10 refers to progress information in a user history file (Step S104), and confirms that the project "Kobe Port Serial Murder Case" of the selected project code 03 is not currently carried out on the user terminal 20 (Step S105). The content delivery server 10 then sends index page data of the selected project "Kobe Port Serial Murder Case" to the user terminal 20 (Step S106). When the index page data are received, the user terminal 20 displays an index page that the received index page data indicates on the display device (Step S107).

Although it is not shown in the drawings, the index page includes a display region in which a title of the project "Kobe Port Serial Murder Case", movement instruction for encouraging the user X to move to "Kobe station" that is a start point of the game, and access instruction for instructing access at a moved point are displayed.

The user X moves to "Kobe station" in accordance with the movement instruction of the index page, and again accesses the content delivery server 10 (Step S101). Then, the processes from Step S102 to Step S107 are carried out in the same manner as described above, and the index page is displayed on the display device of the user terminal 20. When it is specified that current positional information is sent in accordance with an operation by the user X on the input device of the user terminal 20, the user terminal 20 sends the current positional information to the content delivery server 10 (Step S112).

When the current positional information is received (Step S113), the content delivery server 10 acquires access time information indicating a time when there is access by the user terminal 20 (Step S114).

Subsequently, the content delivery server 10 refers to the scenario definition file (Step S115), and confirms that there is content corresponding to the position (PL01 (see FIG. 4)) that the current positional information acquired at Step S113 indicates (Step S116). Then, the content delivery server 10 confirms that any time zone corresponds to all of the contents and content, to which a time zone including the time indicated by the access time information that has been acquired at Step S114 correspond, exist in the above content (Step S117).

As described above, after it is determined that the current position is not out of a service area and the current time is not out of a service time in spite that any time zone corresponds to all of the contents corresponding to the current position, the content delivery server 10 refers to the progress information in the user history file, and updates the number of accesses at the position that the current positional information acquired at Step S113 (that is, adds one to the corresponding number of accesses) (Step S120).

Subsequently, the content delivery server 10 selects content to be delivered in accordance with three kinds of access related information, that is, the current positional information acquired at Step S113, the access time information acquired at Step S114 and a number of accesses (more specifically, a total number of accesses of all users at the same place including a number of accesses updated at Step S120), and the progress information indicating the progress of the game specified by storage information of the user history file (Step S121). The content delivery server 10 then generates and delivers the content selected at Step S121 to the user terminal 20 via the communication network 30 (Step S122).

When the content is received, the user terminal 20 displays the received content. The displayed content includes a display region in which, for example, a hint for a place to which the user X is to move next, a time required, guidance that it is possible to obtain a gift by clear of the game, and the like are displayed.

Figure 12A:
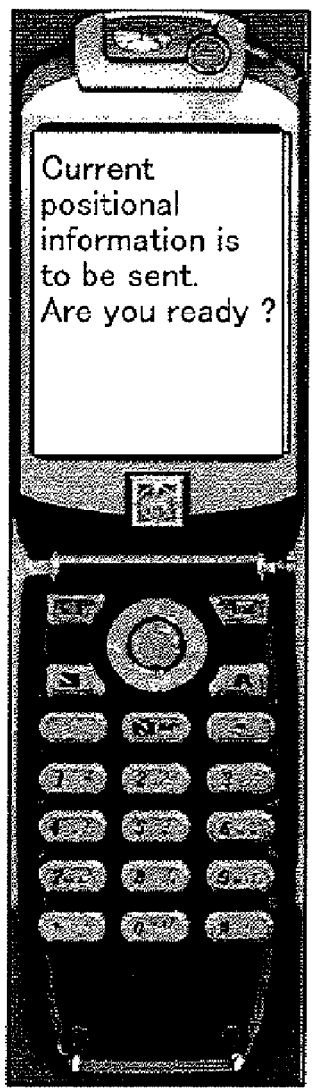
FIGS. 12A and 12B are explanatory drawings that show an example of content used in a game of a project code 03.

The user X moves to a predetermined place such as the Kobe Station or the vicinity of Kobe Port in accordance with the hint by the displayed content, and again accesses the content delivery server 10 (Step S101). Then, the processes from Step S102 to Step S104 are carried out in the same manner as described above, the content delivery server 10 determines at Step S105 that the project "Kobe Port Serial Murder Case" is currently carried out, and sends not the previously delivered content data but predetermined content data to the user terminal 20 (Step S110). When the content data are received, the user terminal 20 displays the content that the received content data indicate (FIG. 12A) on the display device (Step S111). The displayed content includes a display region in which instruction for sending current positional information is displayed.

Here, when it is specified that current positional information is sent in accordance with an operation by the user X on the input device of the user terminal 20, the user terminal 20 sends the current positional information to the content delivery server 10 (Step S112).

When the current positional information is received (Step S113), the content delivery server 10 acquires access time information indicating a time when there is access by the user terminal 20 (Step S114).

Subsequently, the content delivery server 10 refers to the scenario definition file (Step S115), and confirms that there is content corresponding to the position (PL02 (see FIG. 4)) that the current positional information acquired at Step S113 indicates (Step S116). Then, the content delivery server 10 confirms that any time zone corresponds to all of the contents and content, to which a time zone including the time indicated by the access time information that has been acquired at Step S114 correspond, exist in the above content (Step S117).

As described above, since it is determined that the current position is not out of a service area and the current time is not out of a service time, in spite that any time zone corresponds to all of the contents corresponding to the current position, the content delivery server 10 refers to the progress information in the user history file, and updates the number of accesses at the position that the current positional information acquired at Step S113 (that is, adds one to the corresponding number of accesses) (Step S120).

Subsequently, the content delivery server 10 selects content to be delivered in accordance with three kinds of access related information, that is, the current positional information acquired at Step S113, the access time information acquired at Step S114 and a number of accesses (more specifically, a total number of accesses of all users at the same place including a number of accesses updated at Step S120), and the progress information indicating the progress of the game specified by storage information of the user history file (Step S121). The content delivery server 10 then generates and delivers the content selected at Step S121 to the user terminal 20 via the communication network 30 (Step S122).

Figure 12B:
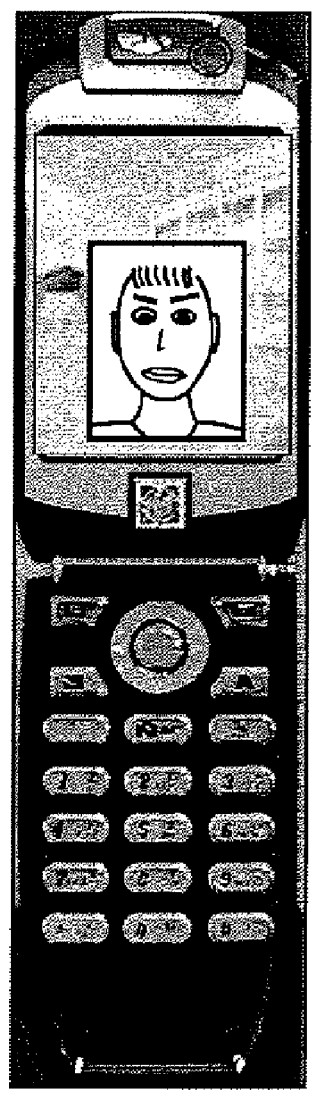

When the content is received, the user terminal 20 displays the received content. The displayed content includes a display region in which, for example, an explanation of an event that has happened at a current position on the game, a description of testimony by each character on the game, a hint for a place to which the user X is to move next, a time required, and the like are displayed. In this regard, in the present example, as shown in FIG. 12B, content in which a character is displayed and the user X is informed of various information by lines of the character (voice) are delivered to the user terminal 20.

By repeatedly carrying out the processes as described above, a story is developed and the game proceeds. In the present embodiment, the content to be delivered is selected in accordance with combinations of the multiple kinds of access related information and the progress information indicating progress of the game. For this reason, even though information that the multiple kinds of access related information indicate is the same as each other, different contents are delivered in the case where progress of the game is different from each other. For example, even when the content delivery server 10 is accessed from the same place at the same time zone and a number of accesses is also regarded as the same number, different contents are to be delivered in the case where progress of the game is different from each other (for example, the places that one user terminal has visited until now are different from those that another user terminal has visited until now).

In this regard, in the present embodiment, after content to be delivered is selected at Step S121, a process to generate the selected content is carried out. For example, as shown in FIG.

13, by combining element data of each of elements "a" to "e" constituting content, which are provided in advance, with each other, content to be delivered is generated. As shown in FIG. 13, the element "a" is a character; the element "b" is a background; the element "c" is a line; the element "d" is a BGM; and the element "e" is an advertisement. In the present example, by combining a part or all of the elements "a" to "e", content is generated. In this case, although multiple kinds of element data are exemplified in each of the elements "a" to "e" in FIG. 13, further more element data may be provided for each of the elements "a" to "e".

In this regard, it is preferable that the advertisement (element "e") is compounded into a background and the like without a feeling of wrongness. For example, it is preferable that such an advertisement is displayed in the similar manner to an advertisement that is actually seen in daily life (for example, an advertisement inside a train, an advertisement stuck on a bench, or the like). In order to compound the advertisement into a background without a feeling of wrongness, element data of the element "e" may be processed to extension, reduction, rotation or the like, and then be used.

As described above, in the third example, the interactive content delivery system 100 is constructed so that in a game in which a scene is shifted in accordance with a predetermined scenario, content to be delivered in accordance with three kinds of access related information relating to access by a user terminal (that is, current positional information, access time information, and a number of accesses) and the progress information indicating progress of the game is selected and delivered to the user terminal 20. Thus, it is possible to change contents to be delivered in accordance with the progress information in addition to the three kinds of access related information, and this makes it possible to further increase variation of a story on the game. Therefore, it is possible to maintain and improve a user's motivation and desire to continue playing the game.

The present invention can be applied to an interactive content delivery system, an interactive content delivery server (a content delivery server) and the like which makes it possible to increase variation of a story on a game by changing contents to be delivered in accordance with multiple kinds of access related information relating to access by a user terminal in the game in which a scene is shifted in accordance with a predetermined scenario. Therefore, the present invention is useful.

The skilled artisan will readily recognize that the present invention, according to another aspect of the invention, may be used to deliver content information to a user terminal in order to provide a virtual tour of geographic locations, such as, for example, foreign cities, including points of interest in those cities. The embodiments described herein may be implemented in the virtual tour system without notable modification. Specifically, the user terminal may be a cellular telephone device, as described herein, comprising a GPS transceiver that enables a user to physically move from one geographic location to another location and receive relevant content information for each geographic point that changes as the user moves.

Alternatively, according to yet another aspect of the present invention, the herein described system may also be used in educational environments such as teaching systems that employ virtual reality simulators. Examples of systems that may use the current invention include flight simulation systems used to teach persons to fly aircraft, driving simulation systems that are used to teach persons to drive vehicles, and the like.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments maybe utilized and derived from the disclosure, such that structural and logical substitutions and changes may be made without departing from the scope and spirit of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

Abstract of the Disclosure is provided to comply with 37 C.F.R. and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the scope and spirit of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed is:

1. An interactive content delivery system comprising an interactive content delivery server and a plurality of user terminals, the interactive content delivery server selecting a selected content to be delivered, for supplying a game in which a scene is shifted in accordance with a predetermined scenario, to an accessing user terminal of the plurality of user terminals every time the accessing user terminal accesses the interactive content delivery server, the interactive content delivery server delivering the selected content to the accessing user terminal via a communication network, the interactive content delivery server comprising:
   a positional information acquirer that acquires positional information from each of the plurality of user terminals via the communication network, the positional information indicating a position of the accessing user terminal that accesses the interactive content delivery server;
   an access related information specifier that specifies multiple kinds of access related information when the interactive content delivery server is accessed by the accessing user terminal, the access related information being information regarding an access of the interactive content delivery server by the accessing user terminal, the multiple kinds of access related information including the positional information acquired by the positional information acquirer;
   a content selector that selects the selected content, from among multiple contents, corresponding to the multiple kinds of access related information specified by the access related information specifier on the basis of scenario definition information, the multiple kinds of access related information corresponding to the multiple contents that can be delivered to the accessing user terminal on the game, wherein the selected content to be delivered is selected in accordance with a scenario; and
   a content deliverer that delivers the selected content selected by the content selector to the accessing user terminal,
   wherein each of the plurality of user terminals comprises:
      a positional information transmitter that transmits the positional information of the user terminal when the user terminal accesses the interactive content delivery server; and
      a content receiver that receives the selected content delivered by the content deliverer of the interactive content delivery server,
   wherein the access related information further includes a number of other user terminals of the plurality of user terminals that are positioned around the accessing user terminal when there is an access from the accessing user terminal, and a same content as the selected content is delivered to the other user terminals, and
   wherein, when the access related information specifier specifies access related information indicating that the number of other user terminals is at least a predetermined number, the content selector selects one of the multiple contents, in which a character appears only when at least the predetermined number of the other user terminals to which the same content is delivered are positioned around the accessing user terminal, as the selected content corresponding to the access related information.

2. The interactive content delivery system according to claim 1, wherein the multiple kinds of access related information further include at least one of a number of accesses indicating a number of times the accessing user terminal accesses the interactive content delivery server on the game, an access time indicating a time when the accessing user terminal accesses the interactive content delivery server, an access season indicating a season in which the accessing user terminal accesses the interactive content delivery server, and an access frequency indicating a frequency of access of the accessing user terminal on the game.

3. The interactive content delivery system according to claim 1, wherein the multiple contents, to which the multiple kinds of access related information correspond, include a guide content having guide information for guiding a user who uses the accessing user terminal to multiple predetermined places, and
   wherein the content deliverer delivers a privilege content including a predetermined privilege to the accessing user terminal when the positional information acquirer acquires all positional information which indicates each of the multiple predetermined places.

4. The interactive content delivery system according to claim 1, wherein the multiple contents corresponding to the multiple kinds of access related information including the positional information include multiple contents each of which has movement information for moving, in turn, a user of the accessing user terminal to a predetermined place different from a position that the positional information indicates.

5. The interactive content delivery system according to claim 1, further comprising:
   a progress information specifier that specifies progress information indicating a progress of the game supplied to the accessing user terminal,
   wherein the multiple contents set in the scenario definition information include multiple contents corresponding to the progress information and the multiple kinds of access related information, and
   wherein the content selector selects one of the multiple contents that corresponds to the multiple kinds of access related information specified by the access related information specifier and the progress information specified by the progress information specifier.

6. The interactive content delivery system according to claim 1, further comprising:
   a scenario definition information memory that stores the scenario definition information.

7. A method of interactively delivering content in an interactive content delivery system by selecting a selected content to be delivered for supplying a game in which a scene is shifted in accordance with a predetermined scenario to an accessing user terminal of a plurality of user terminals every time the accessing user terminal accesses an interactive content delivery server, and delivering the selected content to the accessing user terminal via a communication network, the method comprising:
   acquiring positional information from each of the plurality of user terminals via the communication network, the positional information indicating a position of the accessing user terminal that accesses the interactive content delivery server;
   specifying multiple kinds of access related information regarding an access of the interactive content delivery server by the accessing user terminal when the interactive content delivery server is accessed by the accessing user terminal, the multiple kinds of access related information including the positional information acquired in the acquiring positional information;
   selecting the selected content, from among multiple contents, corresponding to the specified multiple kinds of access related information on the basis of scenario definition information, the multiple kinds of access related information corresponding to the multiple contents that can be delivered to the accessing user terminal on the game, wherein the selected content to be delivered is selected in accordance with the scenario; and delivering the selected content to the accessing user terminal, wherein the access related information further includes a number of other user terminals of the plurality of user terminals that are positioned around the accessing user terminal when there is an access from the accessing user terminal, and a same content as the selected content is delivered to the other user terminals, and wherein, when the number of other user terminals is at least a predetermined number, the selecting selects one of the multiple contents, in which a character appears only when at least the predetermined number of the other user terminals to which the same content is delivered are positioned around the accessing user terminal, as the selected content corresponding to the access related information.

8. The method according to claim 7, wherein the multiple kinds of access related information further include at least one of a number of accesses indicating a number of times the accessing user terminal accesses the interactive content delivery server on the game, an access time indicating a time when the accessing user terminal accesses the interactive content delivery server, an access season indicating a season in which the accessing user terminal accesses the interactive content delivery server, and an access frequency indicating a frequency of access of the accessing user terminal on the game.

9. The method according to claim 7, wherein the multiple contents, to which the multiple kinds of access related information correspond, include a guide content having guide information for guiding a user of the accessing user terminal to multiple predetermined places, and wherein a privilege content including a predetermined privilege is delivered to the accessing user terminal when the positional information indicating each of the multiple predetermined places is acquired.

10. The method according to claim 7, wherein the multiple contents corresponding to the multiple kinds of access related information including the positional information include multiple contents each of which has movement information for moving, in turn, a user of the accessing user terminal to a predetermined place different from a position that the positional information indicates.

11. The method according to claim 7, further comprising:
specifying progress information that indicates a progress of the game supplied to the accessing user terminal,
wherein the multiple contents set in the scenario definition information include multiple contents corresponding to the progress information and the multiple kinds of access related information, and wherein one of the multiple contents that corresponds to the specified multiple kinds of access related information and the specified progress information is selected.

12. A computer program product embodied on a non-transitory computer-readable storage medium containing instructions for causing an interactive content delivery server to interactively deliver a content to an accessing user terminal of a plurality of user terminals by selecting a selected content to be delivered for supplying a game in which a scene is shifted in accordance with a predetermined scenario to the accessing user terminal every time the accessing user terminal accesses the interactive content delivery server, and delivering the selected content to the accessing user terminal via a communication network, the computer program product causing the interactive content delivery server to execute:

acquiring positional information from each of the plurality of user terminals via the communication network, the positional information indicating a position of the accessing user terminal that accesses the interactive content delivery server;

specifying multiple kinds of access related information regarding an access of the interactive content delivery server by the accessing user terminal when the interactive content delivery server is accessed from the accessing user terminal, the multiple kinds of access related information including the positional information acquired in the acquiring positional information;

selecting the selected content, from among multiple contents, corresponding to the specified multiple kinds of access related information on the basis of scenario definition information, the multiple kinds of access related information corresponding to multiple contents that can be delivered to the accessing user terminal on the game, wherein the selected content to be delivered is selected in accordance with the scenario; and delivering the selected content to the accessing user terminal, wherein the access related information further includes a number of other user terminals of the plurality of user terminals that are positioned around the accessing user terminal when there is an access from the accessing user terminal, and a same content as the selected content is delivered to the other user terminals, and wherein, when the number of other user terminals is at least a predetermined number, the selecting selects one of the multiple contents, in which a character appears only when at least the predetermined number of the other user terminals to which the same content is delivered are positioned around the accessing user terminal, as the selected content corresponding to the access related information.

13. The computer program product according to claim 12, wherein the multiple kinds of access related information further include at least one of a number of accesses indicating a number of times the accessing user terminal accesses the interactive content delivery server on the game, an access time indicating a time when the accessing user terminal accesses the interactive content delivery server, an access season indicating a season in which the accessing user terminal accesses the interactive content delivery server, and an access frequency indicating a frequency of access of the accessing user terminal on the game.

14. The computer program product according to claim 12, wherein the multiple contents to which the multiple kinds of access related information respectively correspond include a guide content having guide information for guiding a user of the accessing user terminal to multiple predetermined places, and wherein a privilege content including a predetermined privilege is delivered to the accessing user terminal of when the positional information indicating each of the multiple predetermined places is acquired.

15. The computer program product according to claim 12, wherein the multiple contents corresponding to the multiple kinds of access related information including the positional information include multiple contents each of which has movement information for moving, in turn, a user of the accessing user terminal to a predetermined place different from a position that the positional information indicates.

16. The computer program product according to claim 12, wherein the multiple contents set in the scenario definition information include multiple contents corresponding to progress information indicating a progress of the game supplied to the accessing user terminal and the multiple kinds of access related information,
   wherein the computer program product further causes the computer to execute:
      specifying the progress information; and
      selecting one of the multiple contents that corresponds to the specified multiple kinds of access related information and the specified progress information.

\* \* \* \* \*

UNITED STATES PATENT AND TRADEMARK OFFICE
CERTIFICATE OF CORRECTION

PATENT NO. : 7,805,530 B2
APPLICATION NO. : 11/468075
DATED : September 28, 2010
INVENTOR(S) : K.Yamaguchi Page 1 of 1

It is certified that error appears in the above-identified patent and that said Letters Patent is hereby corrected as shown below:

Column 30, line 16 (claim 3, line 10) of the printed patent, after "acquires" delete "all".

Column 32, line 55 (claim 14, line 8) of the printed patent, after "terminal" delete "of".

Signed and Sealed this
Twenty-fifth Day of January, 2011

David J. Kappos
*Director of the United States Patent and Trademark Office*